US009198538B2

(12) United States Patent
Safar

(10) Patent No.: US 9,198,538 B2
(45) Date of Patent: Dec. 1, 2015

(54) ROTATING GRILL PLATFORM WITH BLADE TILTING MECHANISM UTILIZING HEAT ENERGY GENERATED BY THE GRILL SOURCE OF HEAT

(75) Inventor: Samir Hanna Safar, San Diego, CA (US)

(73) Assignee: Samir Hanna Safar, San Diego, CA (US)

( * ) Notice: Subject to any disclaimer, the term of this patent is extended or adjusted under 35 U.S.C. 154(b) by 601 days.

(21) Appl. No.: 13/590,381

(22) Filed: Aug. 21, 2012

(65) Prior Publication Data

US 2014/0053739 A1 Feb. 27, 2014

(51) Int. Cl.
*A47J 37/00* (2006.01)
*A47J 37/07* (2006.01)

(52) U.S. Cl.
CPC .......... *A47J 37/0754* (2013.01); *A47J 37/0704* (2013.01); *A47J 2037/0795* (2013.01)

(58) Field of Classification Search
CPC .............. A47J 37/0704; A47J 37/0713; A47J 2037/0795; A47J 37/0754
USPC .......... 99/401, 447, 450, 473, 474; 126/25 A, 126/25 AA, 25 R
See application file for complete search history.

(56) References Cited

U.S. PATENT DOCUMENTS

| 980,501 | A | * | 1/1911 | Doll ................................. 126/14 |
|---|---|---|---|---|
| 3,103,162 | A | * | 9/1963 | Scofield ........................... 99/427 |
| 4,345,514 | A | | 8/1982 | Morley |
| 4,561,348 | A | | 12/1985 | Halters et al. |
| 5,154,159 | A | | 10/1992 | Knafelc et al. |
| 5,931,148 | A | * | 8/1999 | Freeman .......................... 126/29 |
| 5,967,135 | A | * | 10/1999 | Shariat ...................... 126/275 R |
| 6,029,565 | A | | 2/2000 | Plymale |
| 6,516,792 | B1 | * | 2/2003 | McDonald ..................... 126/9 R |
| 6,520,174 | B1 | * | 2/2003 | Scigliuolo .................... 126/25 R |
| 2002/0017289 | A1 | * | 2/2002 | Carr et al. .................... 126/25 R |
| 2002/0083940 | A1 | | 7/2002 | DeClue |
| 2007/0277807 | A1 | | 12/2007 | Taban |
| 2008/0168977 | A1 | | 7/2008 | Daud |

* cited by examiner

*Primary Examiner* — Reginald L Alexander

(57) ABSTRACT

A rotating grill platform functional as an independent grill unit or placeable on a grill and that incorporates a stationary lower grill platform with a rotator Fan attached to it in a manner to draw air comprised of smoke and cooking vapors from the grilling chamber and to recirculate the air back to the grilling surface to provide substantially uniform heat distribution for the food being cooked, with the blade tilting mechanism designed to increase or decrease the grill platform rotational speed as per user preferences and the cooking requirements. The grill platform is compact, lightweight, versatile and does not require gas or any Electric power, but can operate in a self sustaining manner.

18 Claims, 24 Drawing Sheets

ROTATING GRILL PLATFORM WITH BLADE TILTING MECHANISM UTILIZING HEAT ENERGY GENERATED BY THE GRILL SOURCE OF HEAT

FIELD OF THE INVENTION

The present invention belongs to the field of grilling devices and more particularly relates to a grilling apparatus having a rotating grill platform with a blade tilting mechanism utilizing heat energy generated by the grill source of heat.

BACKGROUND OF THE INVENTION

Most out-door grills, ovens, and pizza ovens have a fixed grill platform where food placed on.

Despite various improvements and progress in the field, some major obstacles still exist. In most prior art barbecue devices, the combustion fuel is either charcoal or gas. In most barbecues utilizing charcoal, the intensity of the heat generated cannot be regulated. When grilling meat or chicken on a grill, since it is in fixes position on the grilling platform, the melting fat, grease or blood enflames the charcoal or the gas which in turns burns the meet and blacken it. When backing a pizza, because of the unevenness of the oven heat, the outside edges of it get burned. When roasting a chicken, rotating it makes it cook even in the inside and out without burning one side because of unevenness of the heat. Now they utilize electrical energy for outdoor grills to rotate the chicken. The food consequently has differently heated parts (with the parts close to the rear wall being hotter than the parts facing the usual closure door of the cooking chamber), this leading to various drawbacks such as a different degree of preparation (for example cooking) of different parts of the food and the need to move the food within the chamber so that different parts of it are made to face said rear wall. This latter requirement means that the oven door has to be opened with consequent entry into it of air at ambient temperature and a reduction in the internal temperature, with obvious drawbacks.

The major disadvantage of gas or electric barbecues is that an adequate supply of gas or electricity must always be readily available. Using a grill outside, it is hard to find an electrical outlet to connect to electric motor. When people on outdoor picnic or recreational parks, very seldom we find an electrical source. That is way grill don't come with motors.

Moreover, with many existing barbecues a large quantity of heat is retained by the casing which makes the unit dangerous to carry immediately following operation. Portable electrical appliances allowing indoor grilling are presently of greater preference as they incorporate means for removing smoke and cooking vapors. Therefore such an appliance may conveniently be utilized in closed areas without polluting ambient air where cooking is done.

Accordingly, improvements are needed in the existing methods and structures that negate the above shortcomings in the existing systems.

The relevant prior art methods, which will deal with light sources, are as follows:

U.S. Pat. No. 5,154,159 discloses a portable barbecue cooker for use without solvent ignition means or impregnated charcoal briquets. A turbo air blower communicates with ignited briquets through a distributive port plenum chamber and brings ignited briquets to operating temperature rapidly. A vertically and rotationally movable elevator brings the briquets, at operating temperature, to the char grill, and by conveying rotary movement to the char grill, distributes the briquets evenly thereupon. The elevator engages the char grill for vertical movement and for variable spacing with respect to the cook grill. The char grill is equipped with a support cage and plough blades which rotate with the char grill to move ashes from the cooker bowl bottom for transport to an ash collector. Either paper kindling or piezoelectric means provide initial ignition for the briquets in an ignition chamber.

U.S. Pat. No. 4,561,348 describes an apparatus for grilling meat and the like comprising an assembly for one or more sets of fan blades 11 to be driven by a motor 10 arranged outside the grilling space 2 and elements 13 heating the air so that a hot air flow can be maintained inside the grilling space around the meat supported on rotating spits 3, the temperature of said air flow being sufficient to cook said meat, heat radiators being provided in the grilling space for superficially scorching the supported meat.

U.S. Pat. No. 4,345,514 claims a continuous rotary hamburger grill that has means for forming unshaped balls or scoops or other quantums of ground meat into hamburger patties as it presses them into cooking relation with the rotating grill plate. The meat quantums deposited on the grill plate at a loading station are carried thereby beneath an adjustably mounted, sloping pressure plate which presses them into sticking relation with the grill plate and compresses them into patties of uniform thickness. A flexible liner of non-stick material, e.g., Teflon, underlies the pressure plate so that the patties slide thereunder. To reduce moisture loss and improve cooking, a flexible cover sheet of non-stick material rides on the top of the patties as they travel through a cooking zone. The free edge of the pressure paper plate liner underlies the adjacent edge of the flexible cover sheet to provide means for feeding the patties beneath such cover sheet.

U.S. Pat. No. 6,029,565 discloses a grill which can be used to cook a variety of items with chicken being the preferred item. The grill has a rotating cooking surface in the shape of a wheel and the items to be cooked are placed around the circumference of the wheel. The heat source is positioned along the axis of the wheel and there is a grease shield positioned to catch grease drippings from food items on the wheel. In addition a supply of barbecue sauce is positioned adjacent the lowest portion of the wheel so the food items to be cooked will pass through the sauce as the wheel rotates.

US Patent Publication No: 20020083940 claims a rotating firebox cooking apparatus. The rotating firebox may be constructed with a grilling apparatus, or it may be easily retrofitted to an existing conventional grilling apparatus. The firebox of the present invention is located within a chamber having a grill at or near the top of the chamber, and the firebox rotates the heat source within the chamber and underneath the grill, creating radiant and convection energy.

US Patent Publication No: 20070277807 describes a stovetop grill having a rotatable turbine to diffuse and spread heat that is carried by hot gases across a cooking area of a grill platform so that food on the platform will be evenly cooked. The turbine includes a disk body that is mounted for rotation around an axis established by a turbine shaft. A plurality of relatively short impeller blades are spaced from one another around the circumference of the turbine body. A plurality of relatively long propeller blades are spaced from one another around the turbine body at a location that is radially inward from the impeller blades. The impeller and propeller blades are punched or cut out and bent upwardly from the turbine body to establish gas passages there through. The turbine is adapted to rotate relative to the grill platform in response to the hot gases that are generated by a heat source (e.g., a gas burner) and pass through the gas passages in the turbine body for imparting a spinning force against the propeller blades, whereby the impeller blades distribute the heat evenly across the cooking area.

US Patent Publication No: 20080168977 provides a charcoal grill (10) providing a rapid ignition and heating of the charcoal, by means of an electric fan (30) that is coupled to the body (12) of the grill. The fan decreases the overall time required to heat the charcoal to proper cooking temperature by increasing the flow of air provided to the charcoal. The increased airflow created by the incorporated fan accelerates the firing-up and heating of the charcoal by channeling air across and through the charcoal. The decreased time required to heat the charcoal to a temperature suitable for cooking, further more ensures more efficient use of the charcoal.

However the purpose and methodology of all the above inventions that are part of prior art do not envisage the unique embodiment of a rotating grill platform that incorporates a mechanical devise using the heat energy that is produced by the grill heat source to rotate the base of the grill platform.

Thus it is desirable to provide a mechanism of utilizing the streaming upward hot air/gas to create rotational motion. The speed of the gas streaming upward rotates a fan that is connected to the apparatus. The entire mechanism is placed on a pivot point to reduce friction.

It will be apparent to those skilled in the art that the objects of this invention have been achieved by providing a rotating grill platform which is unique in nature, unlike existing grilling devices that are suited only for limited purposes. Various changes may be made in and without departing from the concept of the invention. Further, features of some stages disclosed in this application may be employed with features of other stages. Therefore, the scope of the invention is to be determined by the terminology of the following description, claims, drawings and the legal equivalents thereof.

SUMMARY OF THE INVENTION

The present invention may be summarized, at least in part, with reference to its objects.

It is therefore a primary objective of the present invention to provide a rotating grill platform that incorporates a mechanical devise using the heat energy that is produced by the grill heat source to rotate the base of the grill platform.

Another objective of the present invention is to provide a rotating grill platform that allows outdoor or indoor use.

Another objective of the present invention is to provide a rotating grill platform that intersperses the heat uniformly over the item being cooked and allows better distribution of hot air within its cooking chamber so as to improve the preparation quality of the food and in particular of a plurality of food items positioned at different levels within the grill.

Another objective of the present invention is to provide a rotating grill platform that ensures that the food is not directly struck by the hot air flow, so preventing non-uniform preparation.

Another objective of the present invention is to provide a rotating grill platform that transfers both excess heat energy and smoke into the ambient air, for a better cooking experience.

A further objective of the present invention is to provide a rotating grill platform that can be conveniently stored when not in use.

A further objective of the present invention is to provide a rotating grill platform that is light-weight and portable, which can be incorporated in many types of supports and which can be easily dismantled for cleaning.

The invention described herein thus comprises a rotating grill platform that incorporates a mechanical devise having a stationary lower grill platform standing on a base which can be placed on top of a grill that is open or is closed with a casing or which can function as an independent grill itself. Said grill platform spine has a rotator fan attached to it in a manner to draw air from the grilling chamber. Said rotator fan is associated with the grill on which the grilling platform is placed in such a manner as to recirculate hot air comprised of smoke and cooking vapors back to the grilling surface.

The above summary is intended to illustrate exemplary embodiments of the invention, which will be best understood in conjunction with the detailed description to follow, and are not intended to limit the scope of the invention.

Additional objects and embodiments of the invention will be set forth in part in the description which follows, and in part will become apparent to those skilled in the art upon examination of the following, or may be learned by practice of the invention. Thus these and other objects of the present invention will be more readily apparent when considered in reference to the following description and when taken in conjunction with the accompanying drawings.

DESCRIPTION OF THE DRAWINGS

The present invention will be more apparent from the accompanying drawings, which are provided by way of non-limiting example and in which.

DETAILED DESCRIPTION OF THE INVENTION

The following description is presented to enable any person skilled in the art to make and use the invention, and is provided in the context of particular applications of the invention and their requirements.

The present invention may involve novel arrangement of parts to implement the said invention. For example, although a series of parts may be described with reference to a diagram, the order of parts may differ in other implementations when the performance of the parts as a whole is not dependent on one particular arrangement. Further, non-dependent parts may be placed in parallel. Thus, the present invention is not intended to be limited to the embodiments shown.

Figure 1:
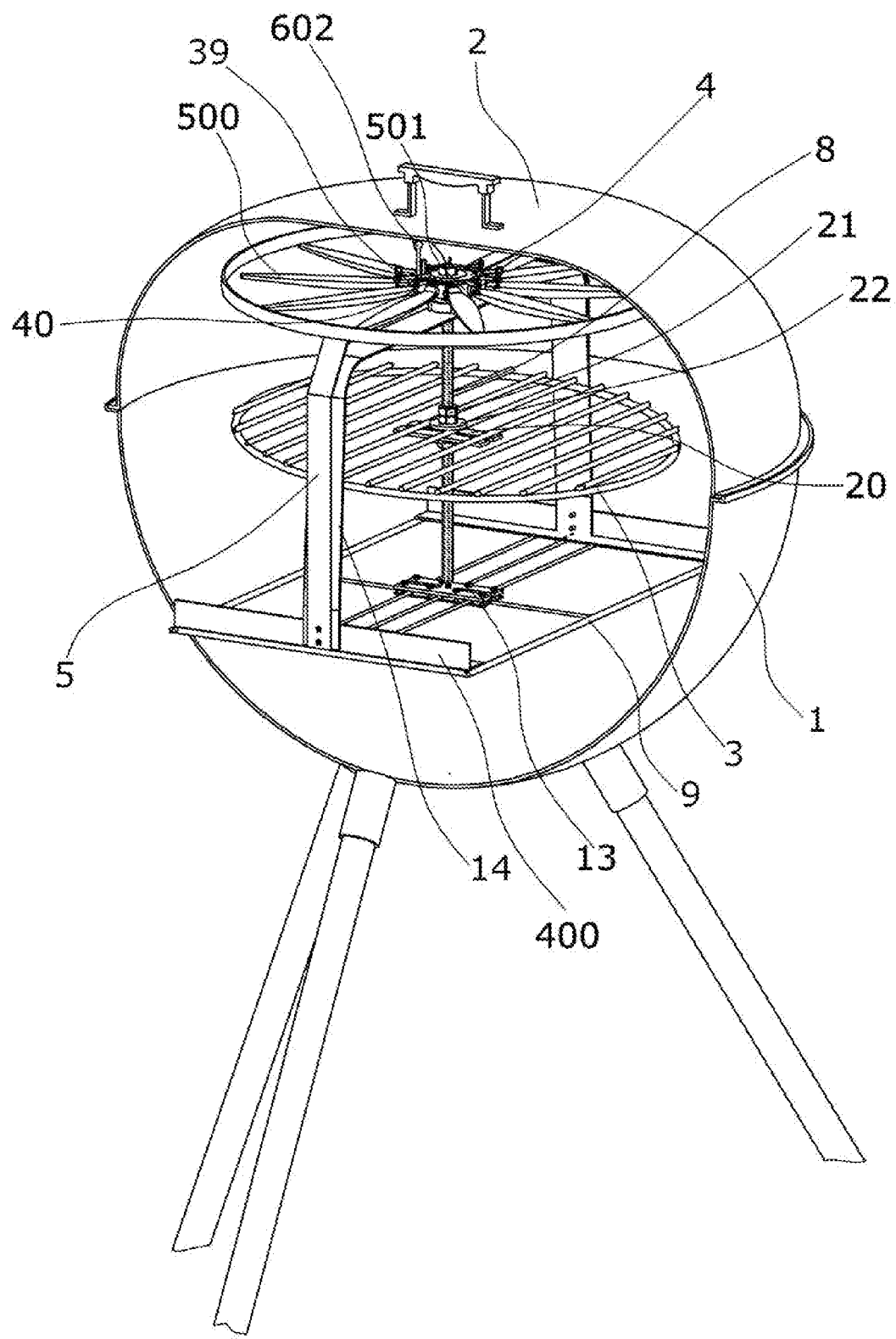
FIG. 1, FIGS. 4-19 are diagrams showing the parts of a preferred embodiment of the present invention.
Figure 2:
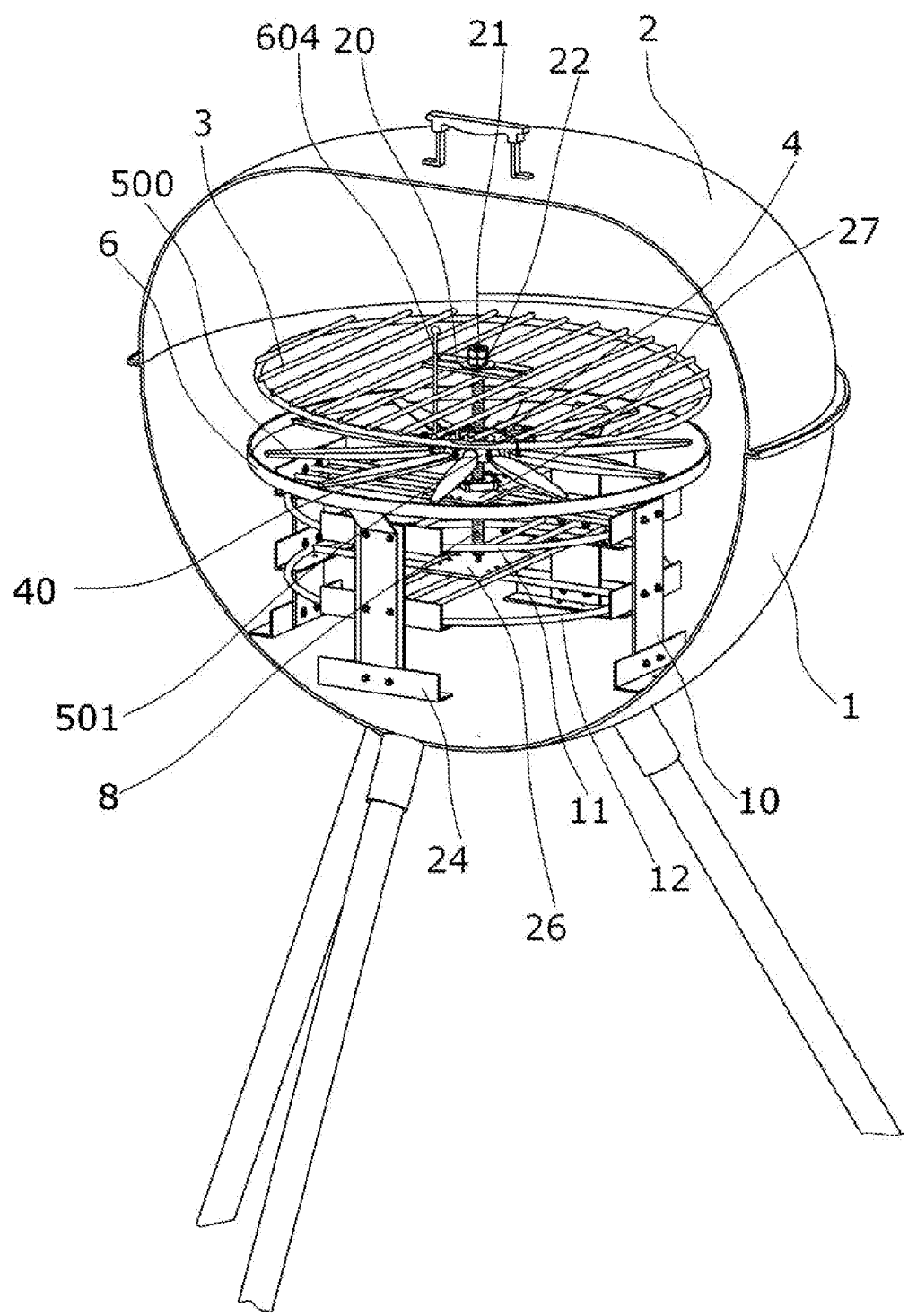
FIG. 2, FIGS. 20-24 are diagrams showing the parts of a second preferred embodiment of the present invention.
Figure 3:
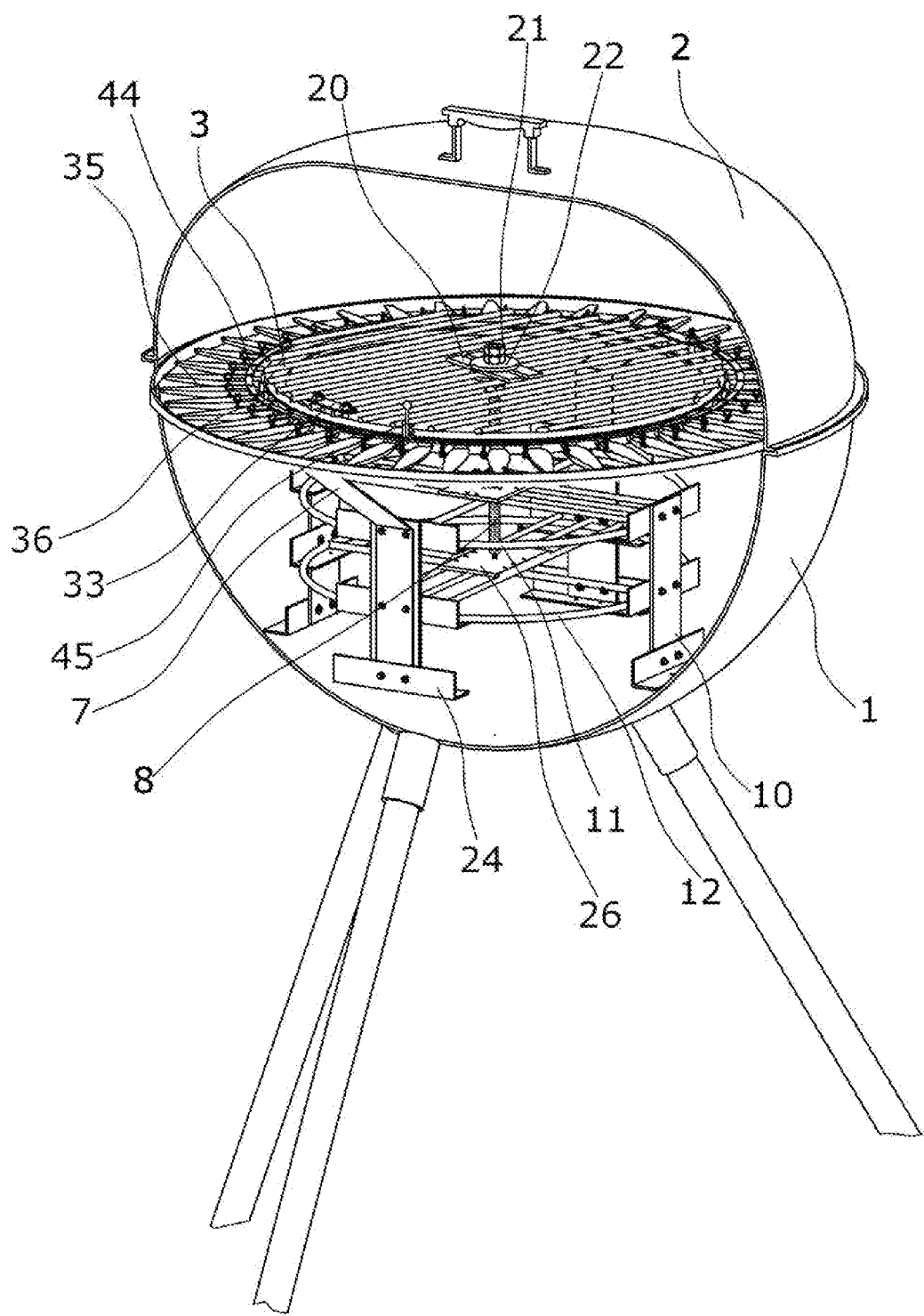
FIG. 3 series are diagrams showing the parts of a third preferred embodiment of the present invention.
Figure 4:
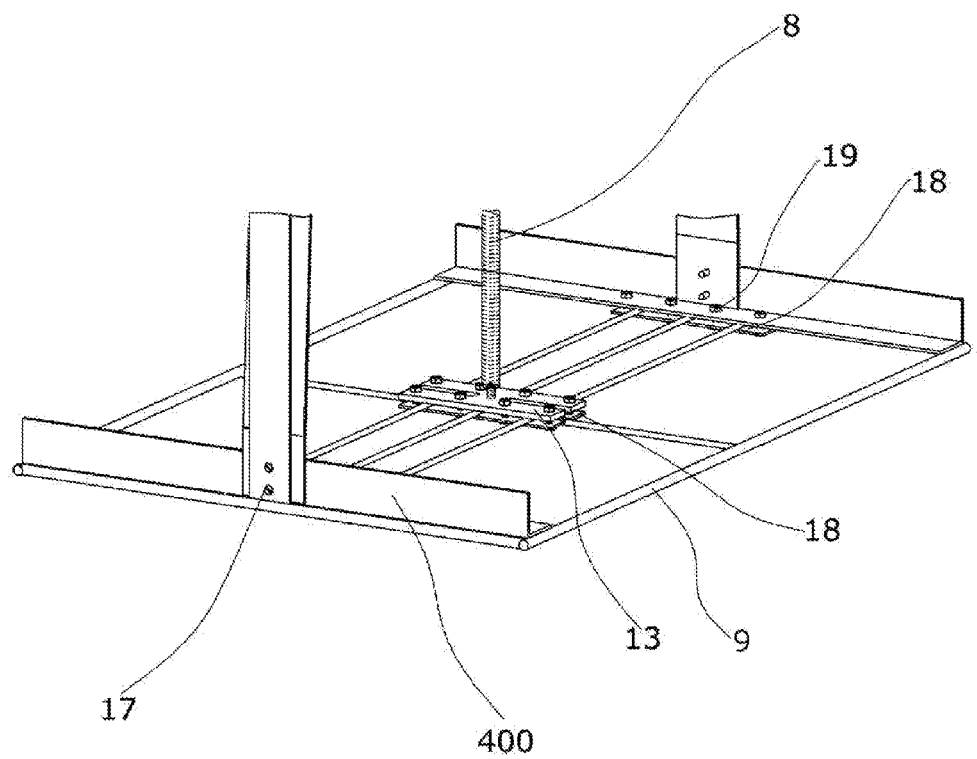
Figure 5:
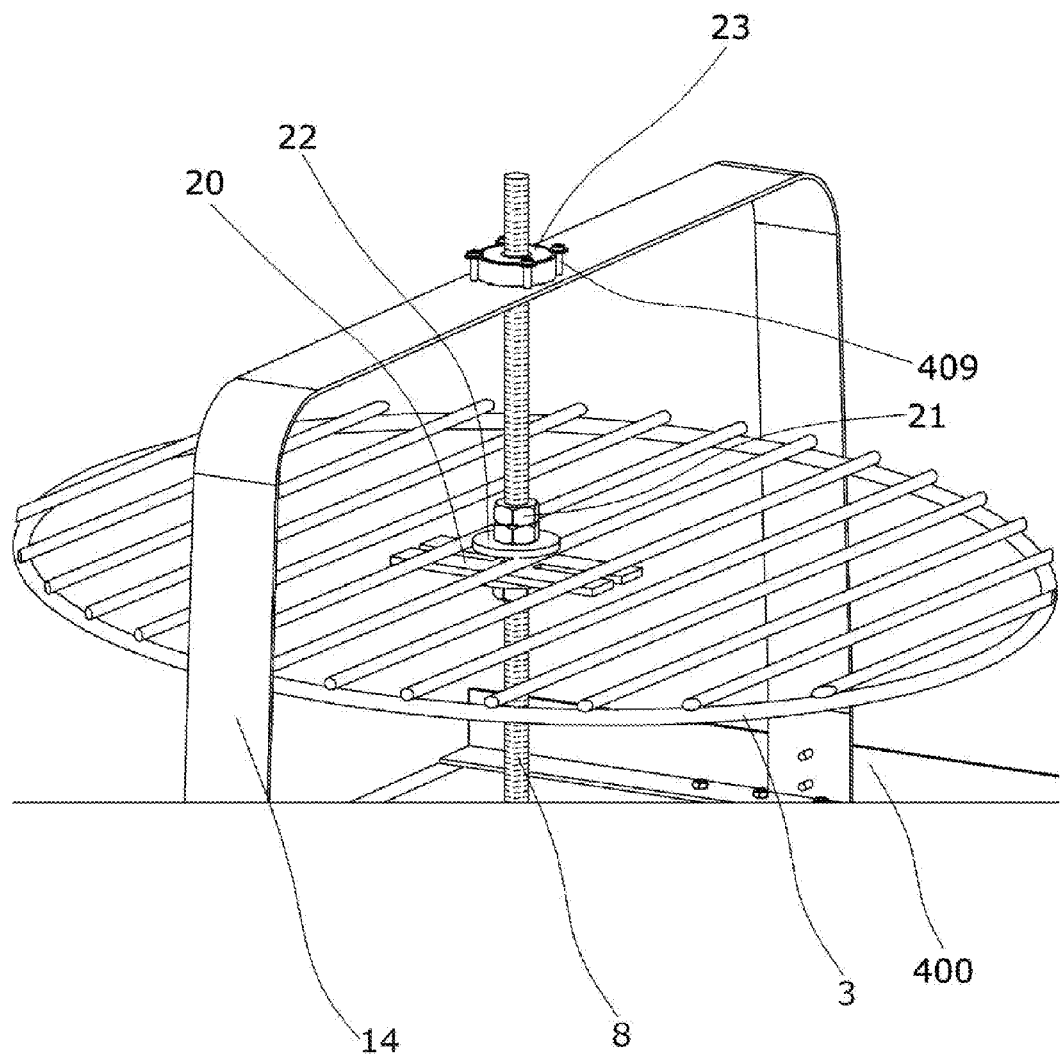

The present invention can be configured as follows:

As illustrated in one claimed embodiment of the present invention as depicted in FIG. 1, and other two claimed embodiments of the present invention as depicted in FIGS. 2 and 3, the present invention comprises of Grill Housing bottom (1), Grill Housing top (2), Grill Platform (3), Blades Assembly Type 1 (4), Blades Protection Assembly (5), Blade Protection Ring (6), Blades Rings Protection Type 3 (7), Device Spine Assembly (8), Base Assembly (9), Fan Blades (10), Device Middle Base Assembly (11), Device Base type 2 & 3 (12), Spine Pivot Assembly (13), Blade Support Assembly (14), Blade Rotation Mechanism Levels stopper (15), Blade Rotation Mechanism Attachment Rings (16), Blade Holding Base (17), Blades Rotation Mechanism Base Ring (18), Device base supporting L shaped bar (19), Supporting Flat plate (20), Nut (21), Washer (22), Ball Bearing Wheel (23), Device L Shaped Support (24), Blade Mechanism Rotation Handle (25), Spine Pivot Base Type 2 & 3 (26), Ball Bearing Wheel (27), Screw (28), Device Vertical Column (29), Screw (30), Rectangle Washer (31), Rectangle Washer (32), Rectangular Washer (33), Screw (34), Blade Adjustment Holding Ring (35), Adjustment Holding ring type 2 & 3 (36), Blade Attachment Screw (37), Blade Mechanism Rotation Handle for Type 2 & 3 (38), Blade Mechanism Adjustment Rings Arm (39), Blade Mechanism Attachment rings (40), Blade Adjustments Mechanism Base Ring Type 3 (41), Blade Adjustment Mechanism Handle Type 2 (42), Rotation Stopper (43), Tilting Mechanize Base Ring Type 3 (44), Blade Adjustment Mechanism Handle Type 3 (45), and Blades Rotation Mechanism Levels Stopper Type 3 (46).

Figure 13:
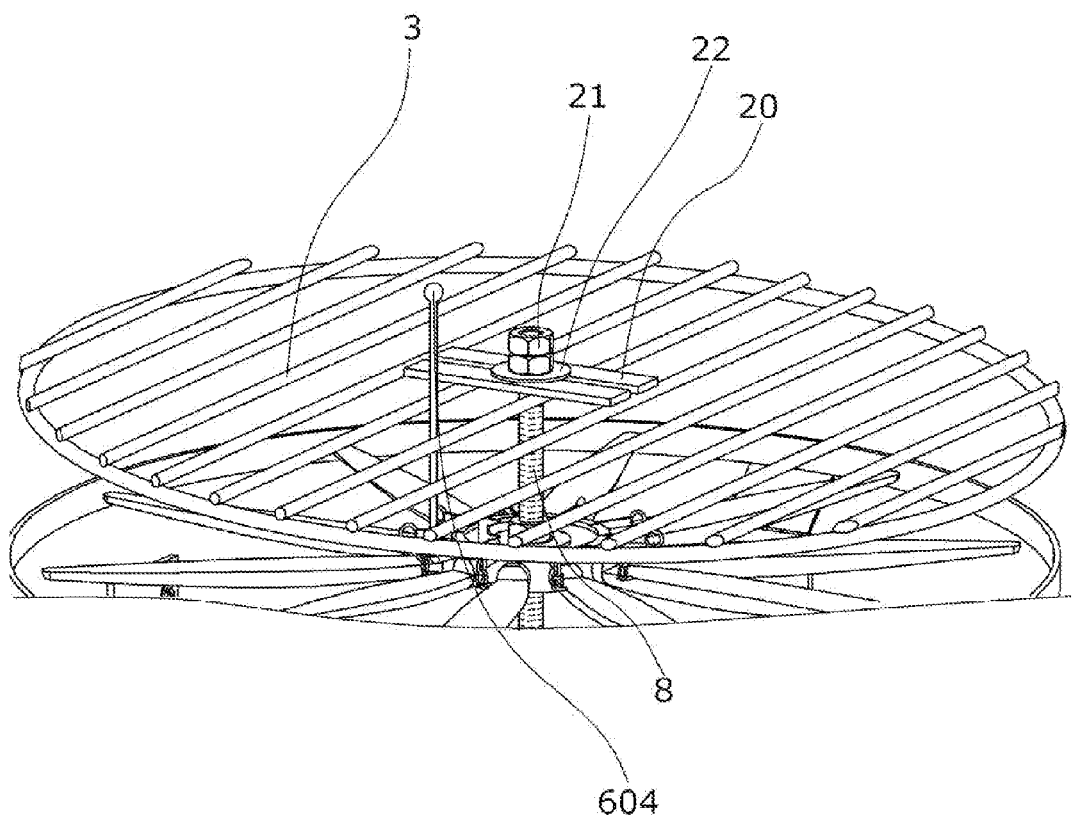
Figure 14:
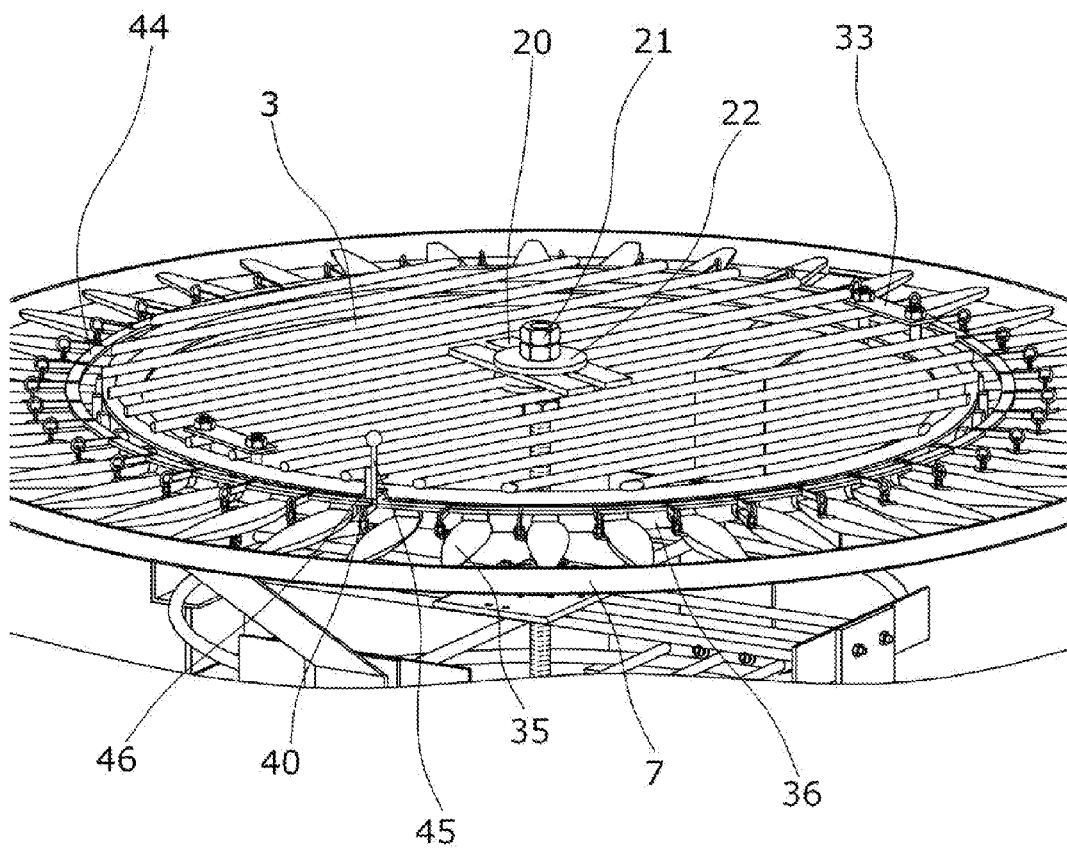
Figure 15:
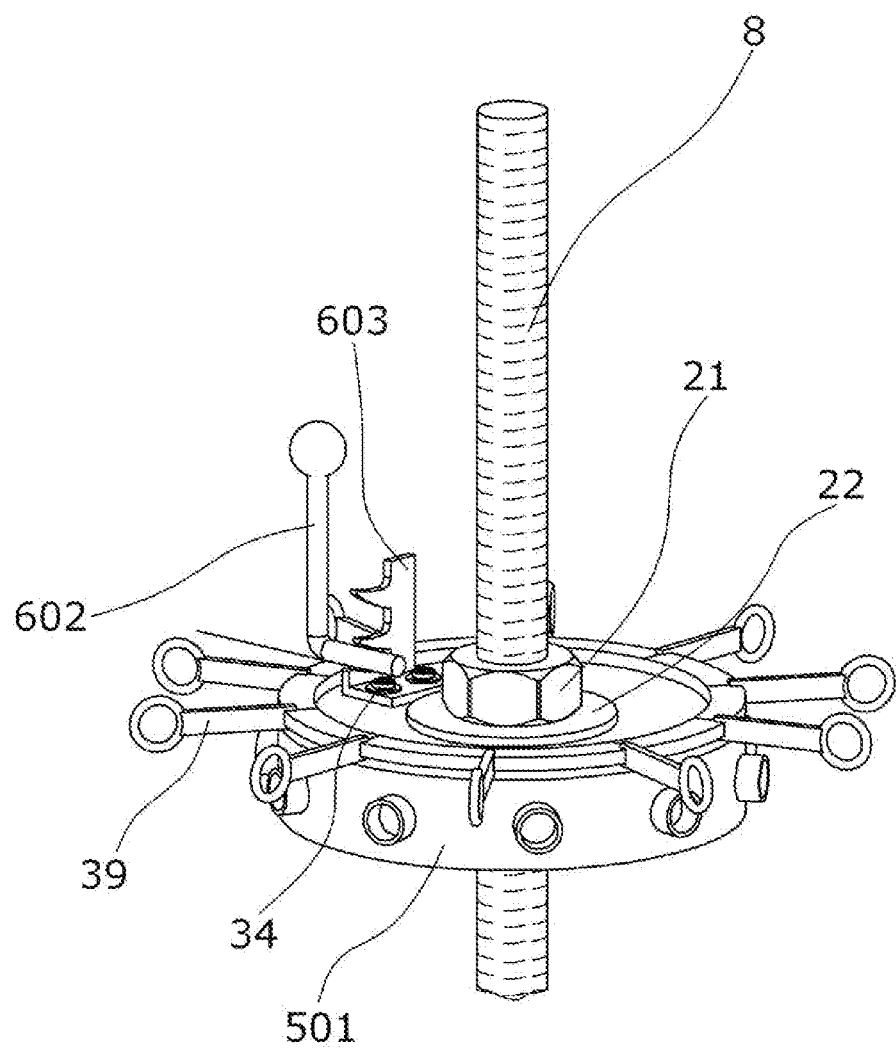
Figure 16:
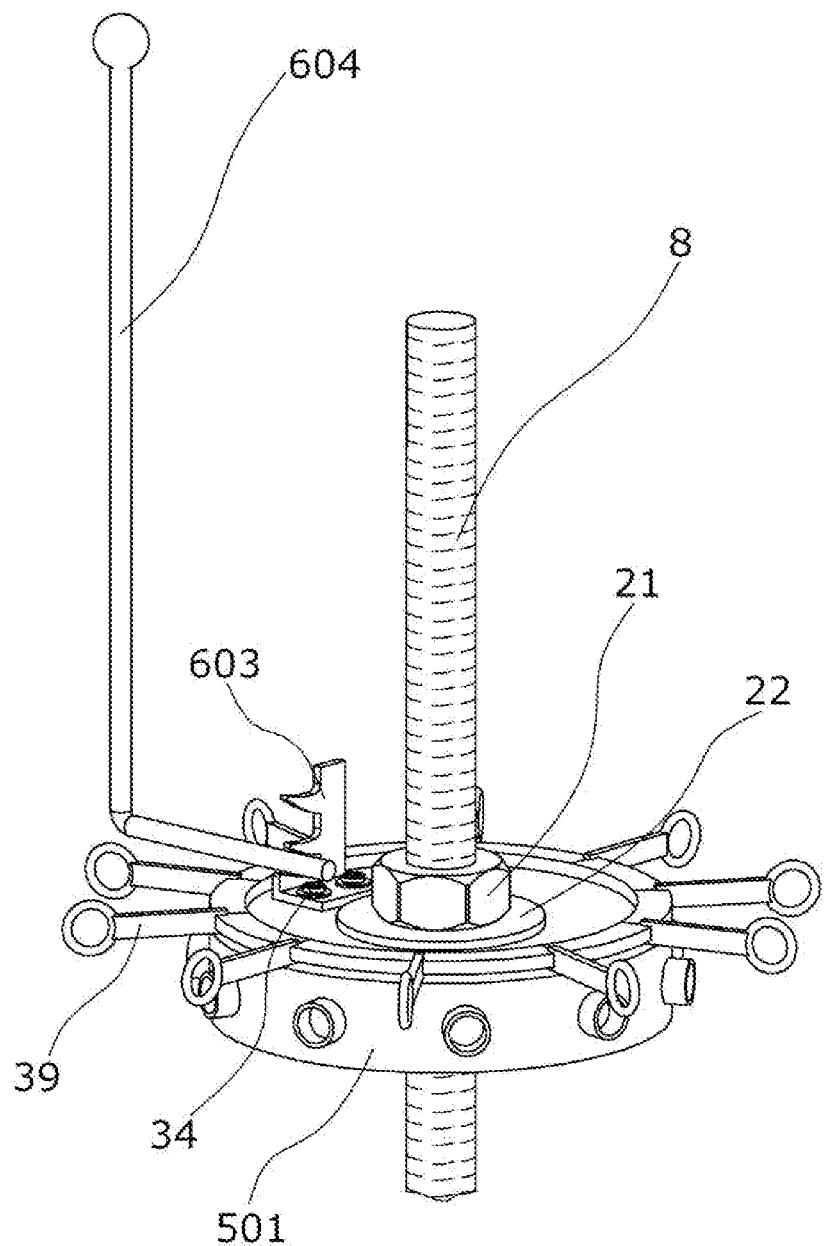
Figure 17:
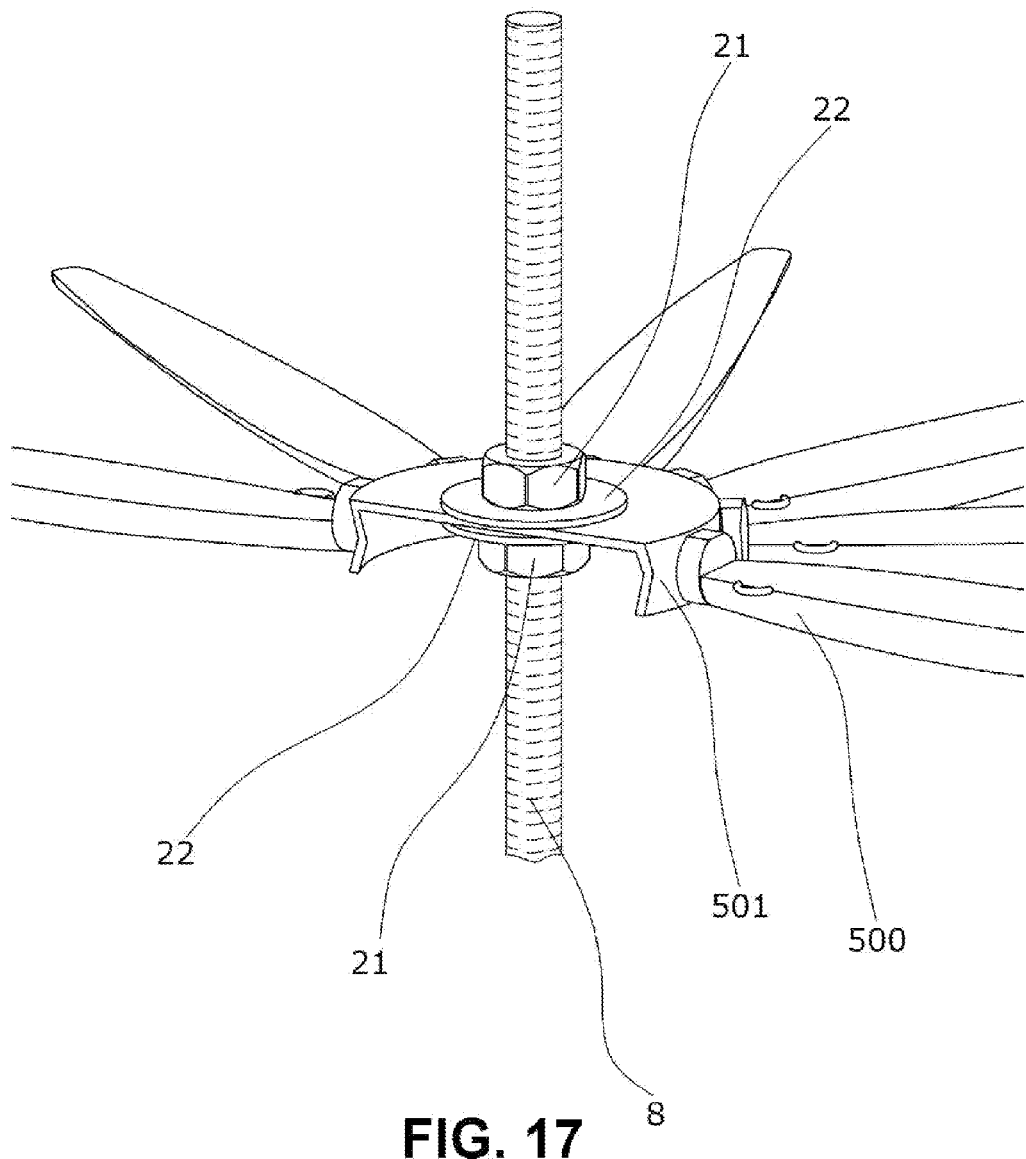
Figure 18:
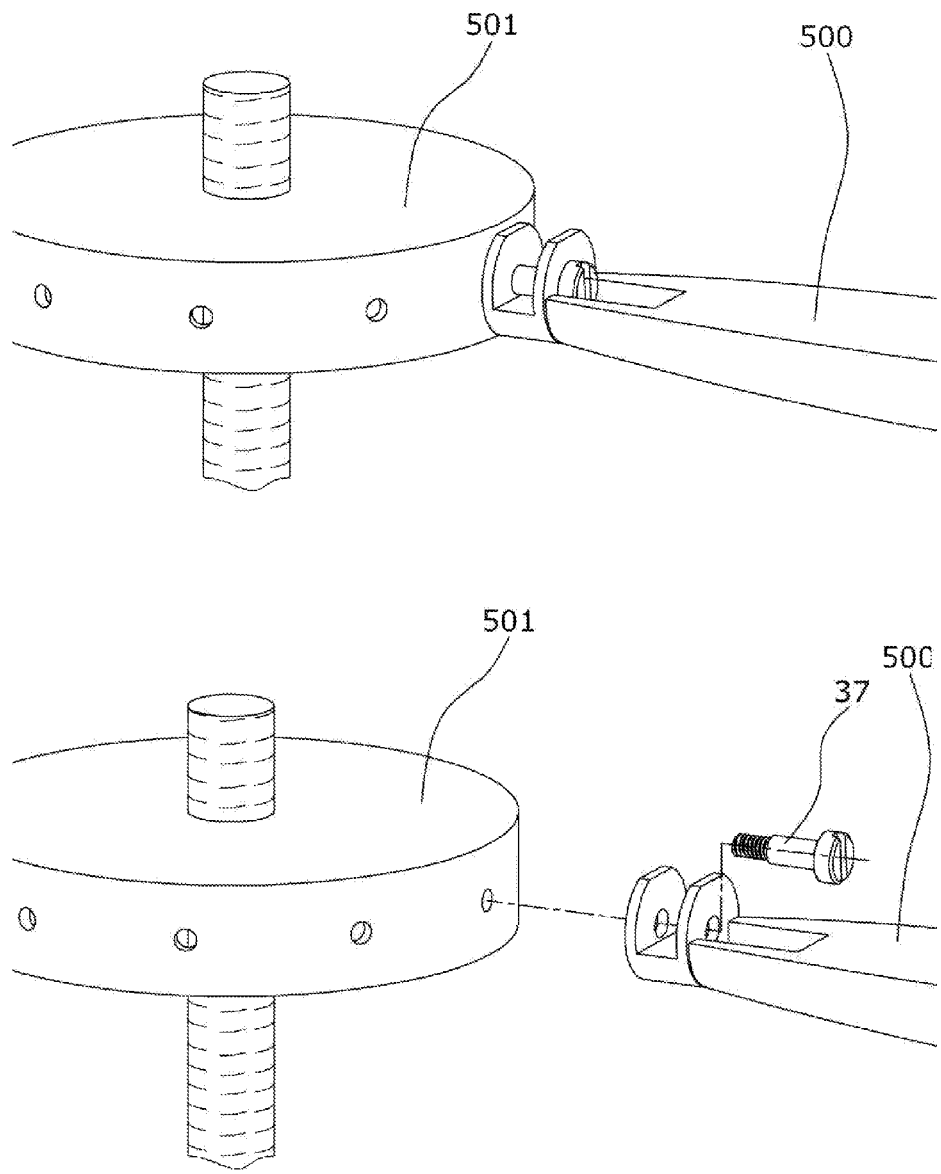
Figure 19:
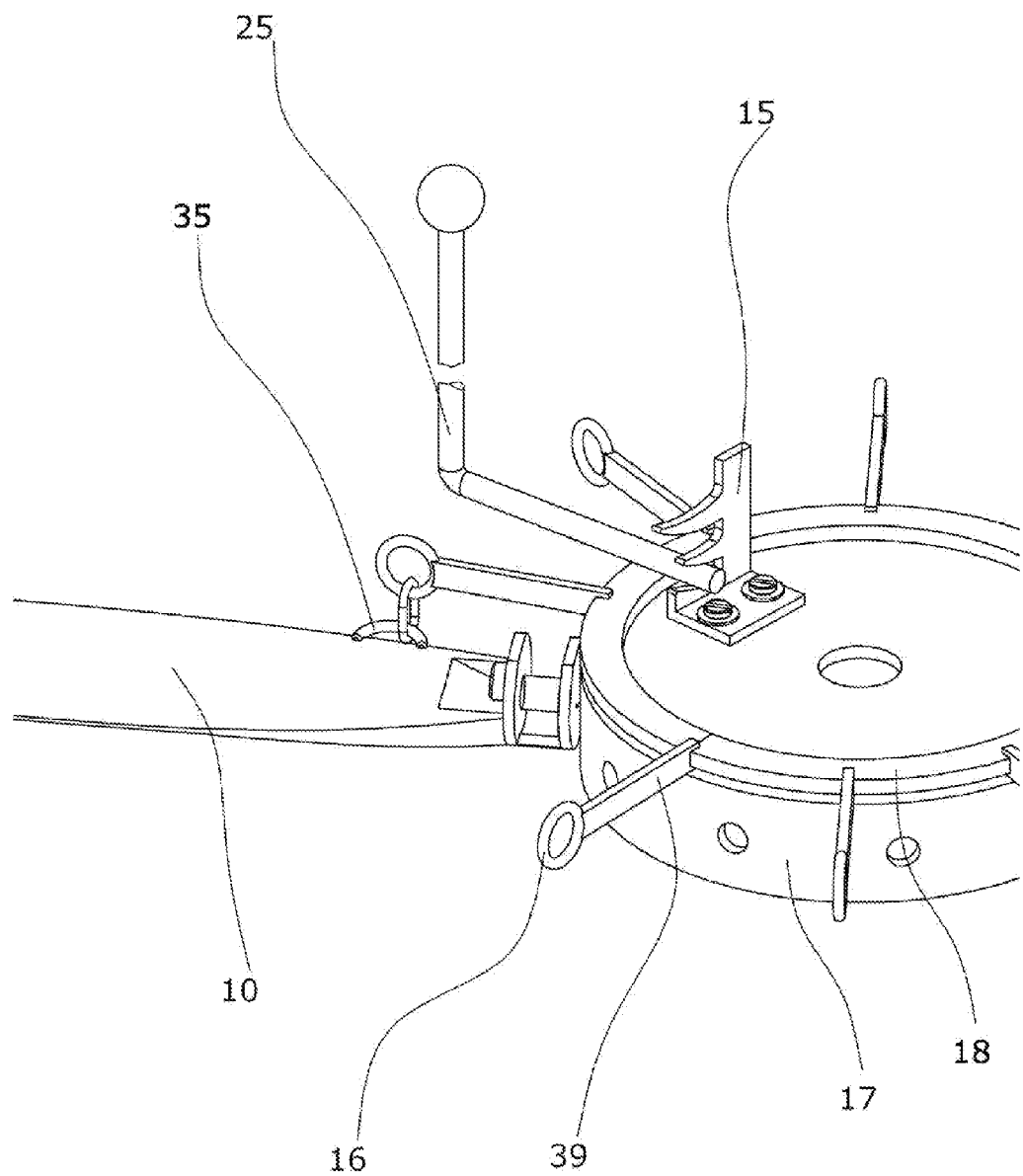
Figure 20:
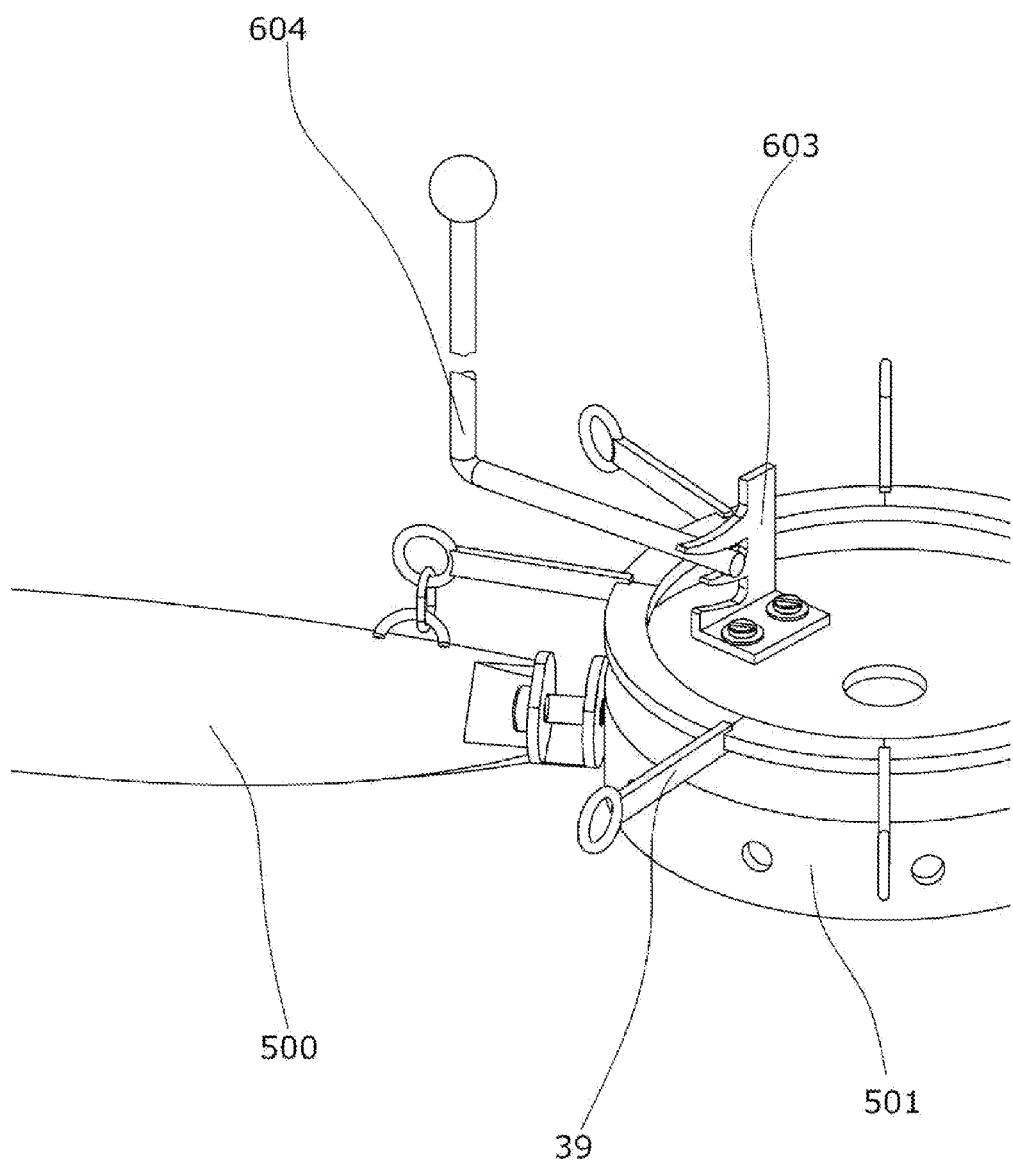
Figure 21:
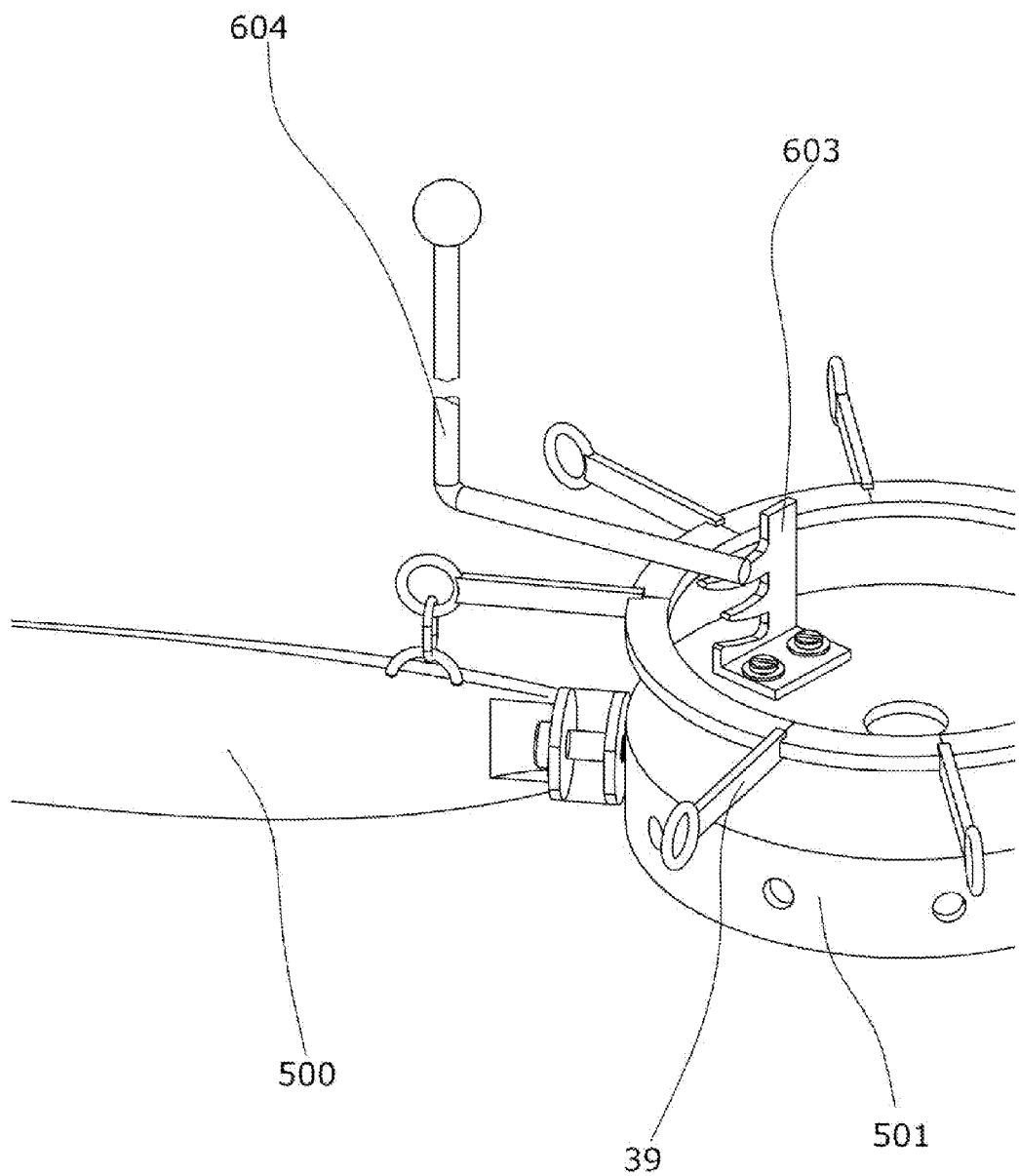
Figure 22:
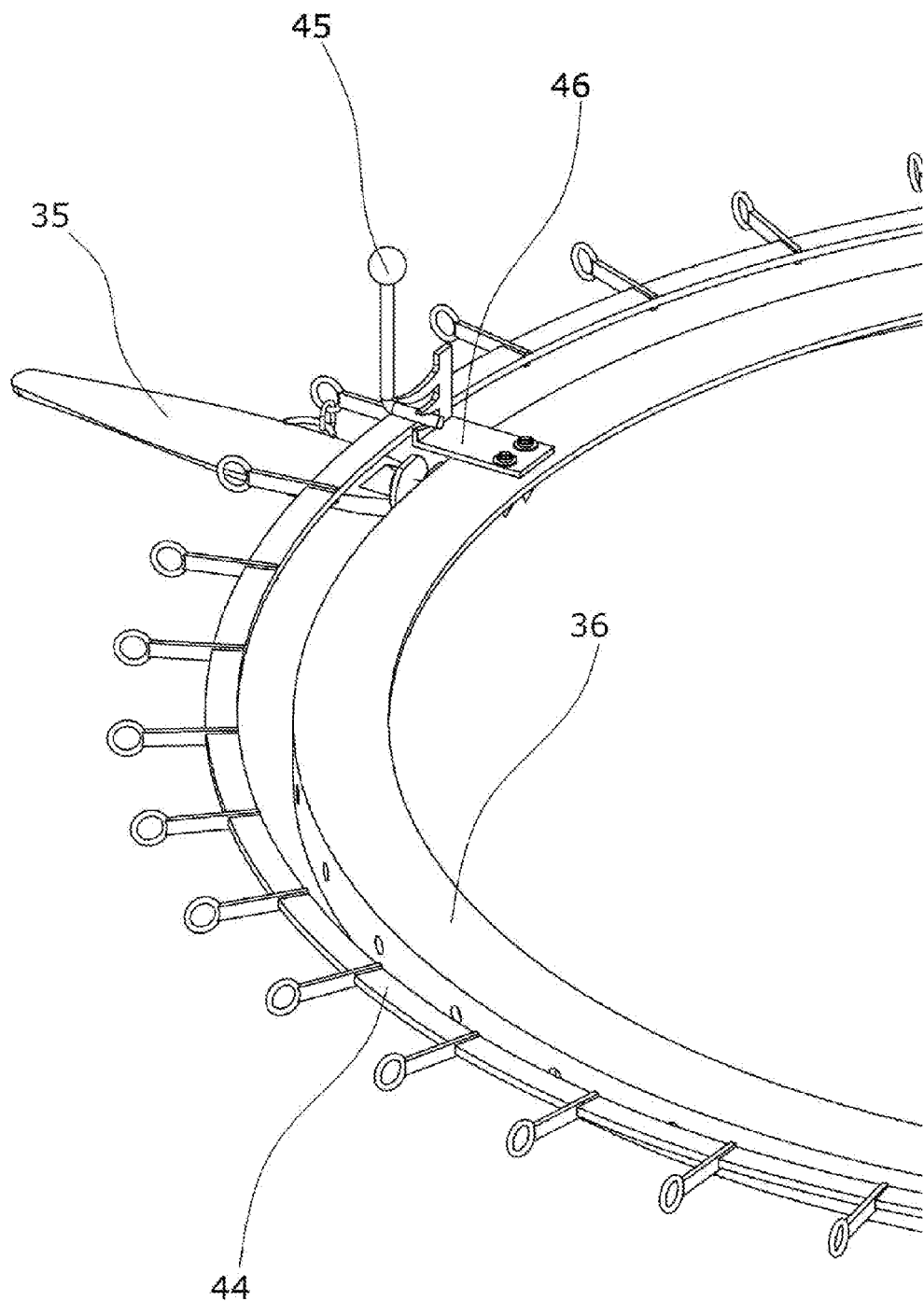
Figure 23:
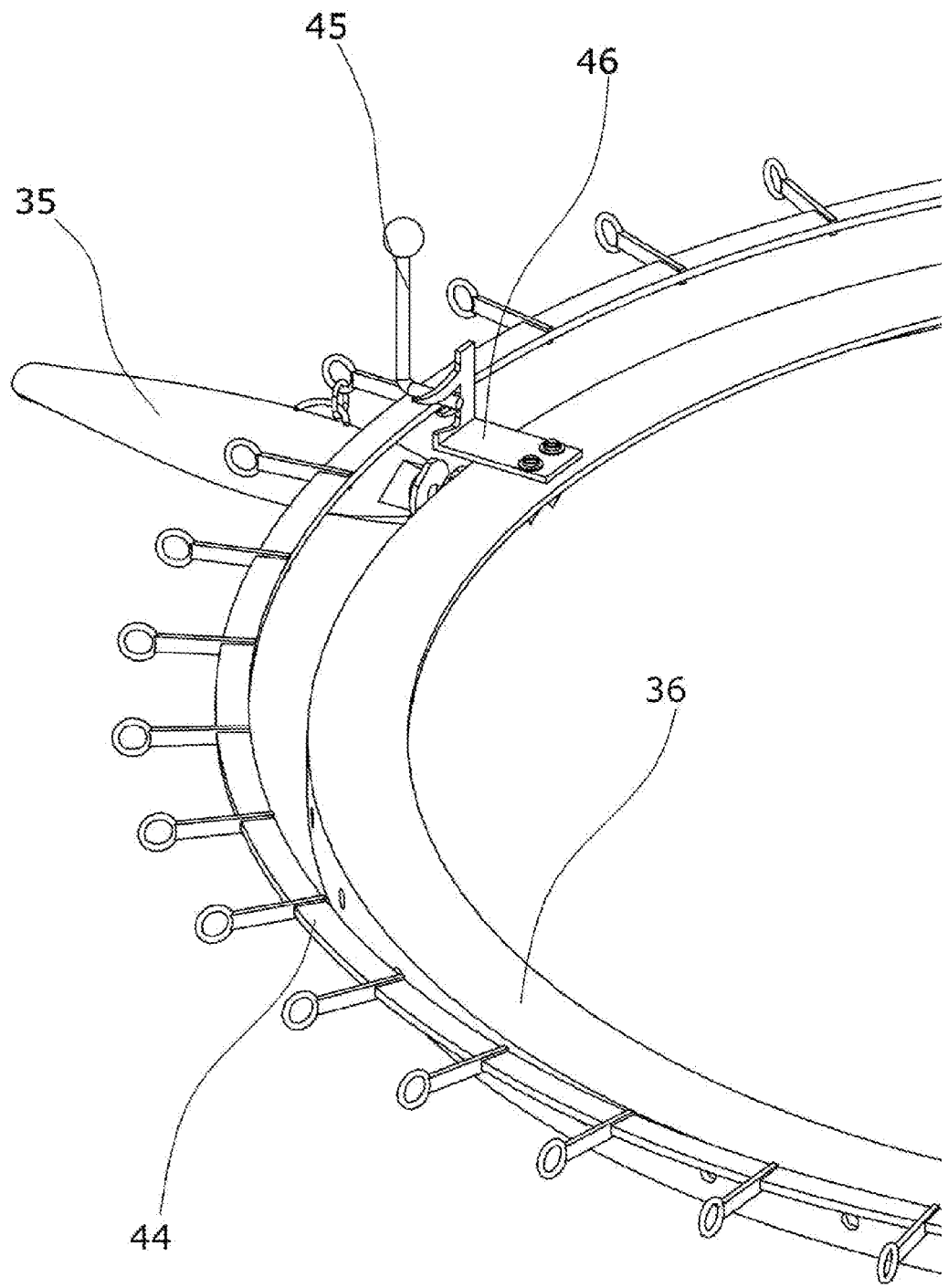
Figure 24:
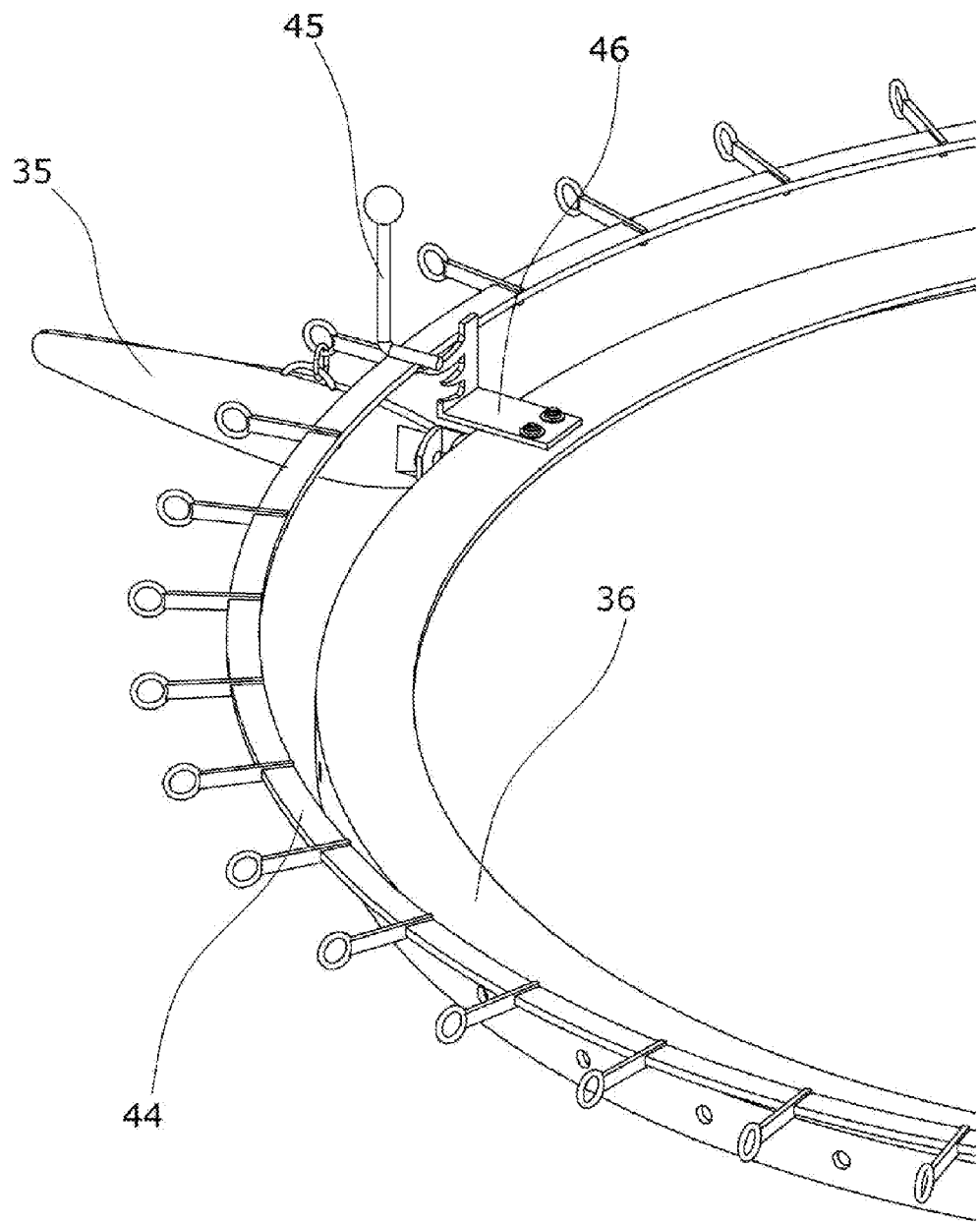

As illustrated in FIGS. 1-5, and 7-8, a primary unit of the present grilling apparatus invention is a rotating grill platform (3) functional as an independent grill unit or placeable on an existing grill having a Grill Housing bottom (1) and a Grill Housing top (2). The present grilling apparatus invention further comprises of a supporting Spine Assembly (8) and a Spine Pivot Assembly (13), an apparatus base assembly (9) on which the Spine Assembly (8) containing the grill platform (3) is placed. The Spine Assembly (8) is further connected to a Blade Assembly (4). Variations of the primary embodiment can be seen as further embodiments in FIGS. 13 and 14.

Figure 6:
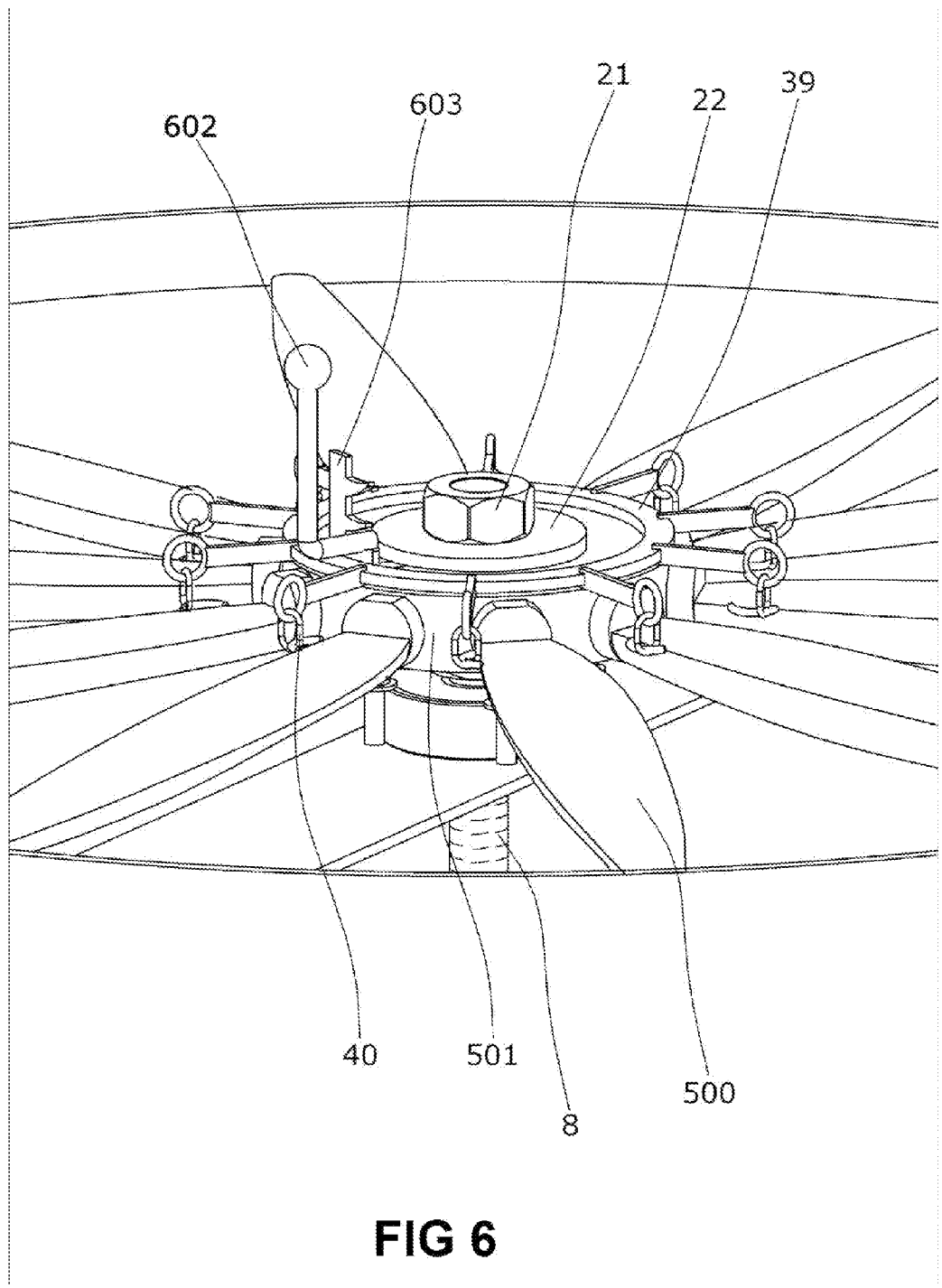
Figure 7:
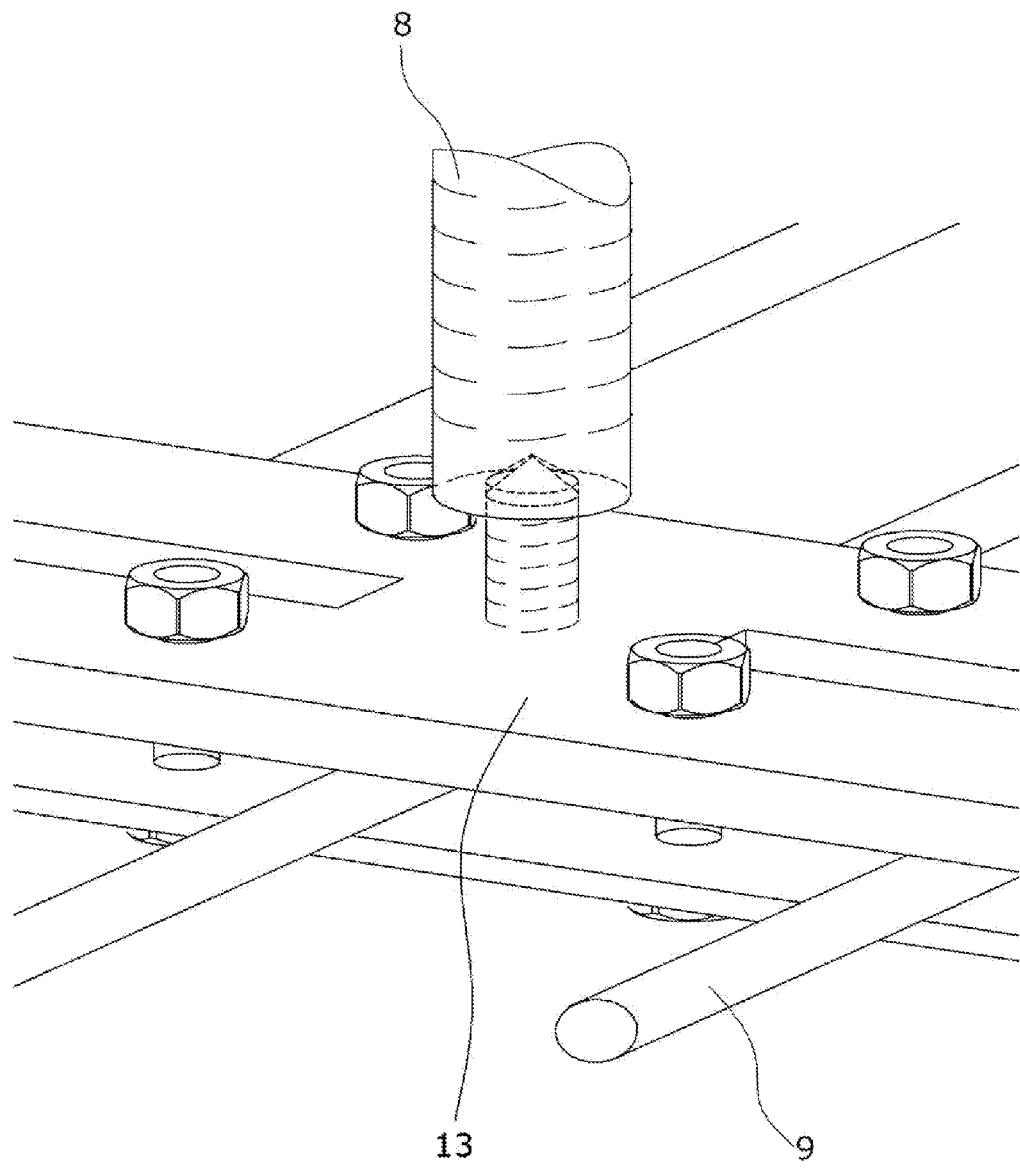
Figure 8:
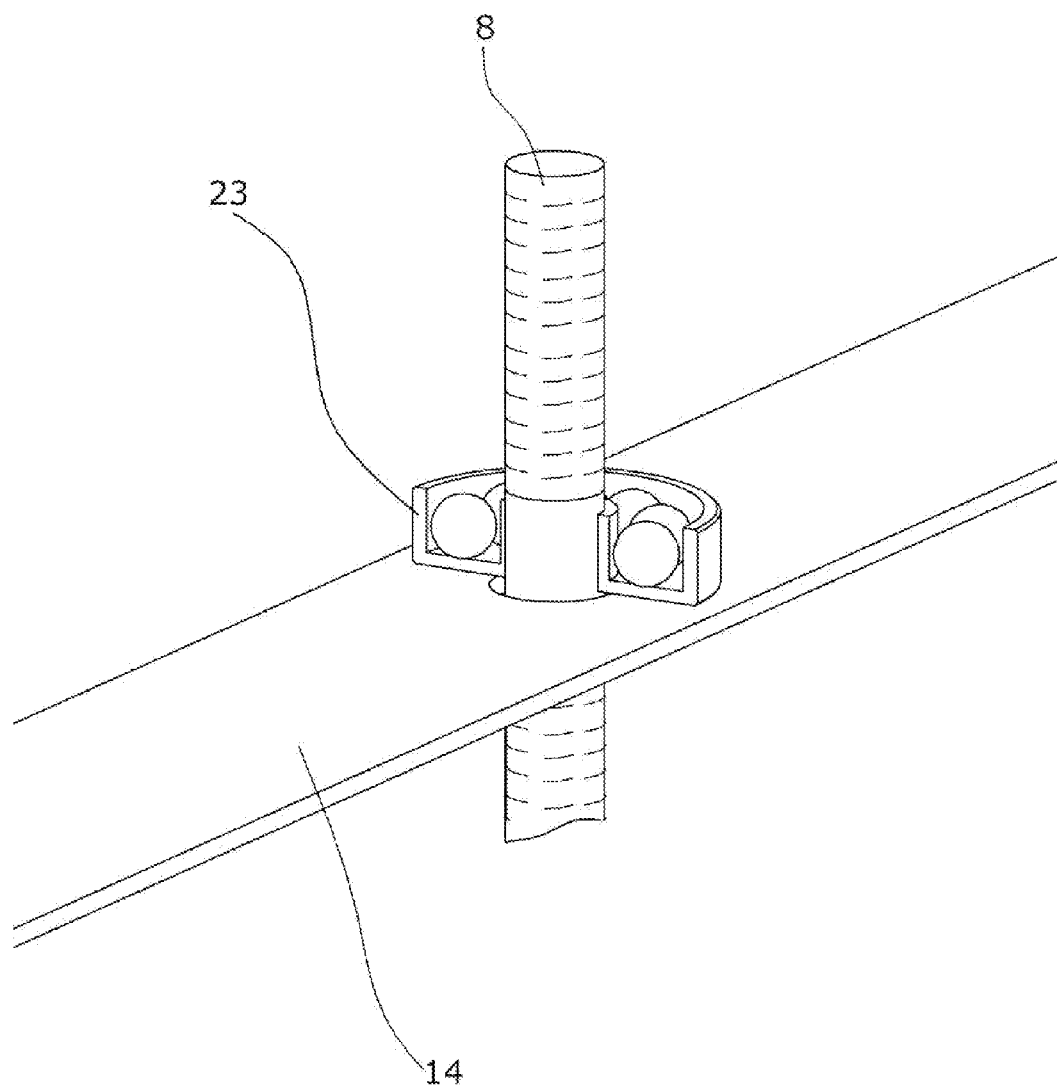
Figure 9:
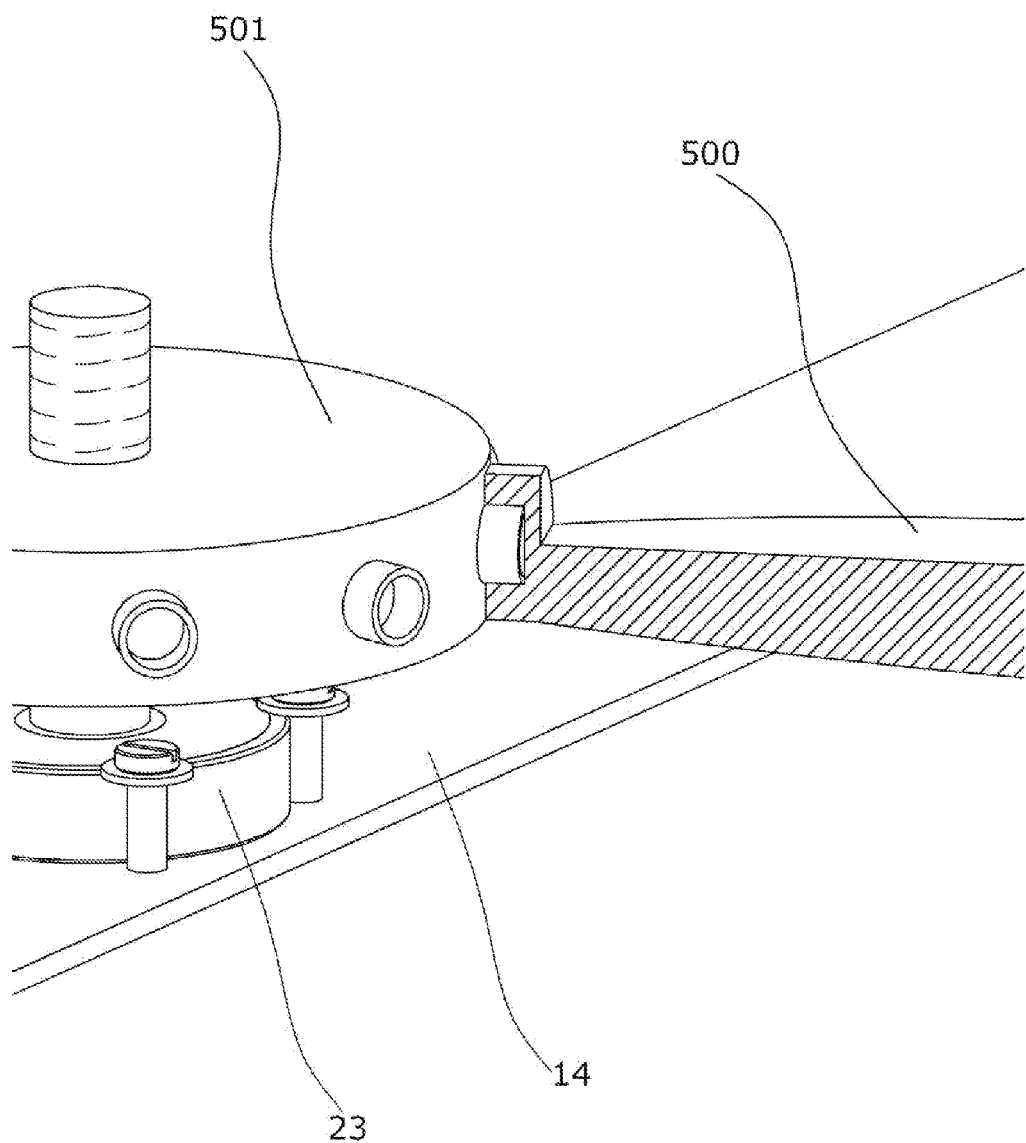
Figure 12:
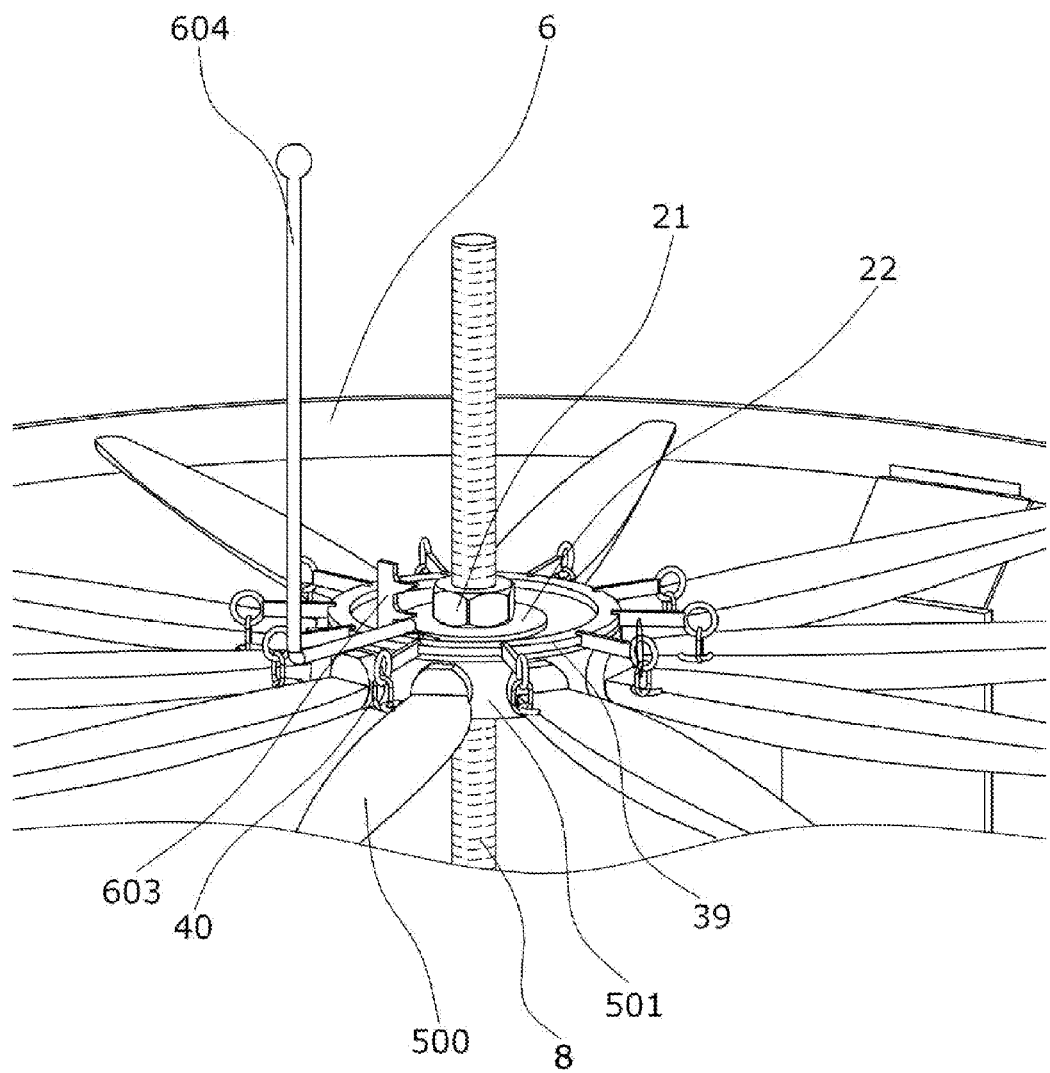

As depicted in FIGS. 6 and 12, the Blade Assembly (4) contains a Blade Protection Assembly (5), Blade Support Assembly (14), a Blade protection Ring (6), Blade Rings Protection (7), Fan Blade (10), Blade Holding Base (17), Blade Adjustment Holding Ring (35), Adjustment Holding ring type 2 & 3 (36), Blade Attachment Screw (37), Blade Mechanism Rotation Handle for Type 2 & 3 (38), Blade Mechanism Adjustment Rings Arm (39), Blade Mechanism Attachment rings (40), Blade Adjustments Mechanism Base Ring Type 3 (41), Blade Adjustment Mechanism Handle Type 2 (42), Rotation Stopper (43), Tilting Mechanize Base Ring Type 3 (44), Blade Adjustment Mechanism Handle Type 3 (45), Blades Rotation Mechanism Levels Stopper Type 3 (46), Blade Rotation Mechanism Attachment Rings (16), Blade Mechanism Rotation Handle (25) and a Blades Rotation Mechanism Base Ring (18).

Figure 10:
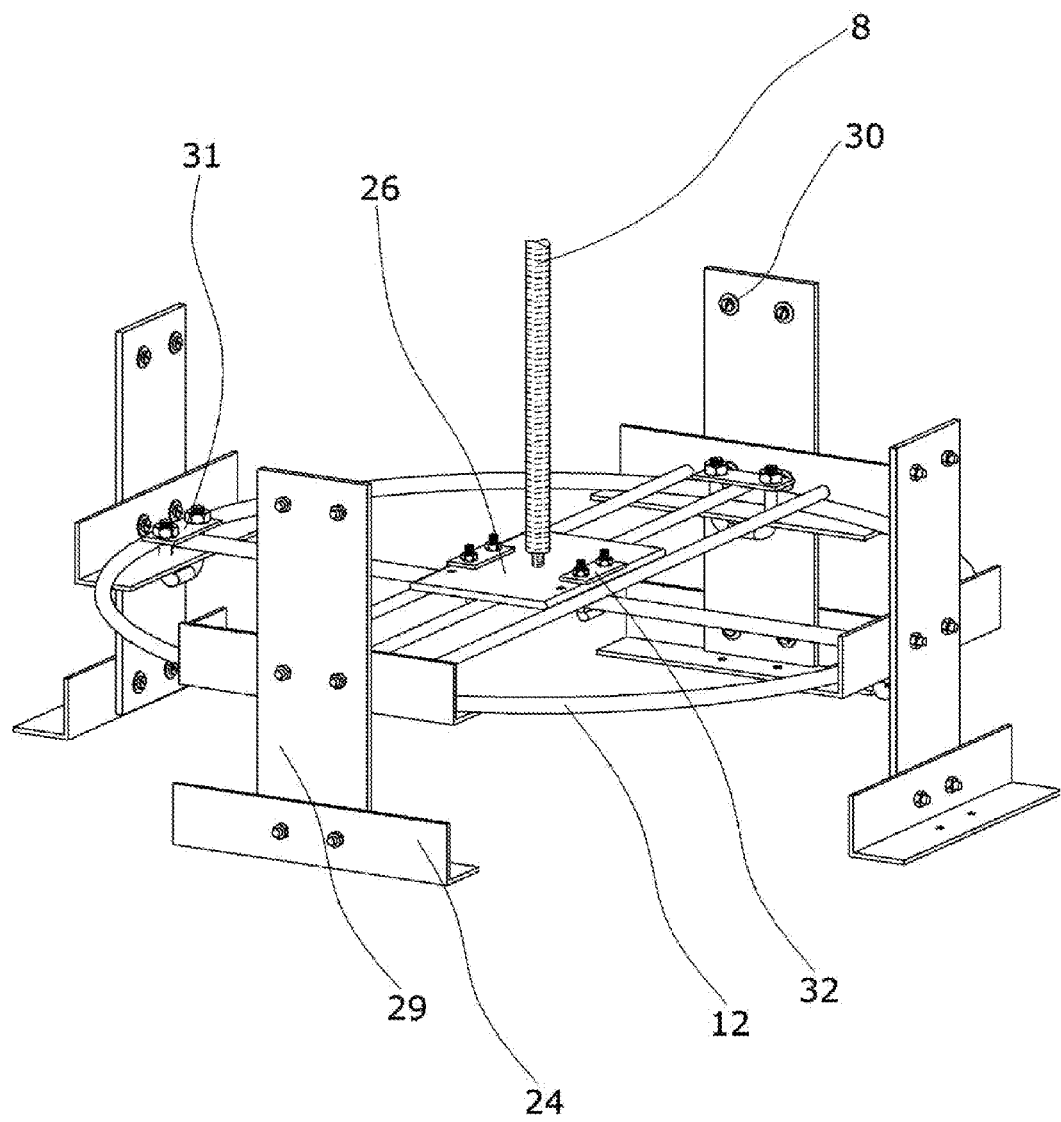
Figure 11:
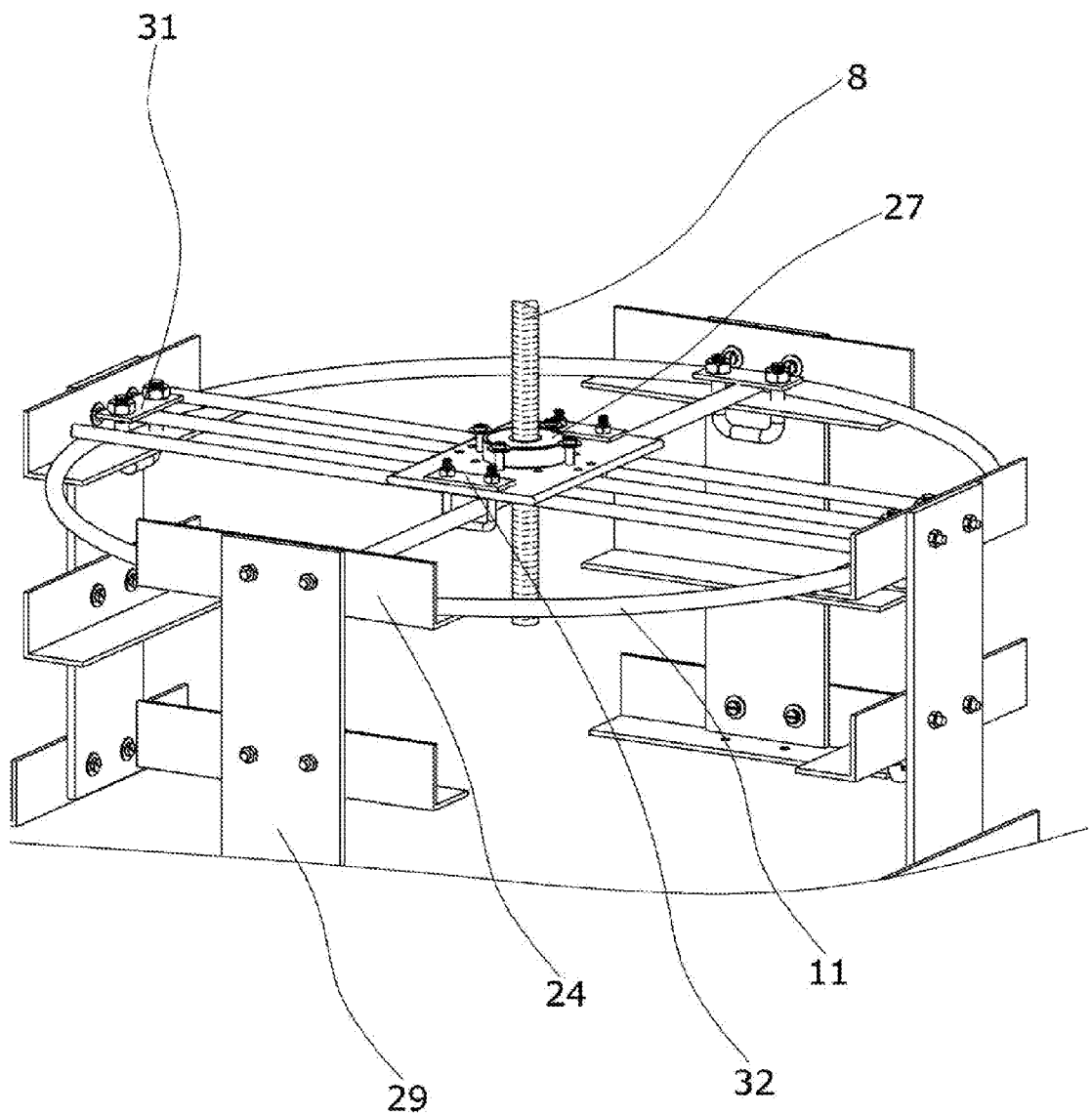

FIGS. 10 and 11 show the Spine Assembly (8) that is connected to the Blade Assembly (4) at the centre of the top bar of the Blade Support Assembly (14) through the Ball Bearing Wheel (27) and the Screw (28). The Grill Platform (3) is connected to the Spine Assembly (8) using the Nut (21) and Washer (22). The Grill Platform (3) is further provided support by resting it on the Supporting Flat plate (20) that is screwed to the Spine Assembly (8). The end of the spine of the Spine Assembly (8) comes to rest on and is supported on a device base supporting L shaped bar (19) with a Device Vertical Column (29) connecting to the Blade Support Assembly (14). The device base supporting L shaped bar (19) is suitable for resting on a horizontal surface.

In a preferred embodiment of the present invention, the entire grill platform (3) rotates on the Spine Pivot Assembly (13) that is attached to the device base supporting L shaped bar (19). A plurality of horizontally extending and equidistantly spaced rods are provided in the grill platform (3) and extend from one end to the other of the grill platform (3) to form a circular peripheral ring pattern. Thus there are empty slots between any of the two rods in the grill platform (3), these slots defining elongated narrow openings through which heat will pass during the grilling process. The grill platform is thus designed to disperse the flames and heat, i.e. to provide substantially uniform heat distribution for the food being cooked.

The function of the Spine Pivot Assembly (13), connected to the Blade Assembly (4) through the Ball Bearing Wheel (27) is to reduce friction during the rotation of the Spine Assembly (8) due to the motion of the Fan Blades (10). This way the entire apparatus rotates freely with minimum force.

In a preferred embodiment of the present invention, the rotating grill platform (3) that is functional as an independent grill unit will have a housing having a casing defining a grilling chamber with the grill platform (3) supported centrally therein. In opened configuration, the grilling apparatus is structured in the form of a semi-closed grilling chamber formed of rolled aluminum or another suitable material the air of which is allowed to communicate with ambient air only through the front side; that is said grilling chamber is delimited on all sides except the front side. On this open side there is provided a usual movable door, not shown. Said grilling chamber is defined by lateral walls, an upper wall, a lower wall and a rear wall, it being open frontally. Said lateral walls are suitably hinged to device base supporting L shaped bar (19) supporting said grill platform (3) to successively close upon the same in closed configuration. Basic mechanical fastening elements may be provided in order to releasably fasten separate walls to each other in opened position. After use the grill may be rolled up by closing said upper wall upon said lower wall. Said lateral walls and said upper wall can be suitably fixed with respect to each other in opened configuration to provide a stationary structure when in operation.

As illustrated in FIG. 16 and FIGS. 19, 20 and 21, the present invention is capable of self rotation without any manual or electric stimulation and the speed of rotation is adjustable such that the rising hot air during the cooking process is uniformly circulated over the cooking area.

The Blade Tilting mechanism of the present invention is designed to increase or decrease the grill platform rotational speed as per user preferences and the cooking requirements. The fan blade (10) is thus capable of turning from zero to 90 degrease on the blade holding base (17) or simply termed the fan base. By lifting the Blade Mechanism Rotation Handle (25) or labeled (38) for the second and third preferred embodiments of the present invention, its position can be locked at a certain height on the Blade Rotation Mechanism Levels stopper (15). This in turn will lift the Blade Rotation Mechanism Attachment Rings (16) which are connected by a chain link to the fan's Blade Adjustment Holding Ring (35) or labeled (36) for the second and third preferred embodiments of the present invention.

As explained earlier the fan blades (10) are aerodynamic in shape, therefore the more perpendicular the direction of the air that hits the blade face is, the faster the spokes of the wind mill rotates. Since the fan blades (10) have an aerodynamic design shape, the blade's angle facing the hot rising determine the amount of force needed to move the fan blades (10) around the device spine assembly (8). When the Blade Mechanism Rotation Handle (25) or (38) moves up or down, this makes the fan blades (10) turn from 0 to 90 degrees. When the fan blade (10) turns 90 degree, the fan blade (10) stops rotating because the hot air force against the fan blade face (10) is at a minimum. The opposite is true, when the Blade Mechanism Rotation Handle (25) or (38) is at the lowest point, the fan rotate the fastest. Thus the more direct hit against the face of the fan blades (10) the faster the fan blades (10) rotate. By tilting the fan blades (10) face away, the force against the fan blades (10) decreases.

In a preferred embodiment of the present invention, the fan blades (10) are taperingly shaped and equidistantly situated from each other such that said blade assembly (4) is naturally rotated when the hot air/gas from the cooking hits these blades through the Blade Mechanism Rotation Handle (25). The blade adjustment attachments ensure that the fan blades are rotated at optimum speed with the available hot air/gas from the cooking. Further the Blades Rotation Mechanism Levels Stopper (15) enables adjustment of the rotation speed of the fan blades (10), thus facilitating even cooking.

The shape, length and width of each fan blade (10) on the blade assembly (4) may be altered for adjusting the proportion of air to be circulated back to the grilling chamber and to be allowed into ambient air such that the user can control the amount of air circulated onto the food article being grilled. An example is depicted in the second embodiment of the present invention as shown in FIG. 3 and FIGS. 22-24.

In a preferred embodiment of the working of the present invention, the grilling chamber contains a combustion zone, located below the apparatus base, in which combustion is achieved by placing small pieces of wood, coal, crushed paper, leaves, or the like and igniting the same. As hot gas/air streams upwards above the rotating grill platform (3), the fan blades (10) rotate due to this upward movement of hot gas/air and circulates the hot gas/air in the grilling chamber. The heat in the grilling chamber rises and creates an updraft in the grilling chamber, with the heated air hitting the fan blades (10) meeting and mixing to create a uniformly heated area in the area above the rotating grill platform (3) where heat is required. The fan blades (10) enable the air moved tangentially by the rotator fan to penetrate into said grilling chamber in all places. Each air stream on striking the fan blades (10) is made to return towards the central axis of the grilling chamber and then propelled in an outward motion, uniformly filling the entire grilling chamber. The food placed on the rotating grill platform (3) is evenly cooked by the uniform heat generated and circulated by this event.

Hot air drawn from across said grilling chamber by the fan blades (10) and being circulating back by the motion of the fan blades (10) has direct effects on the quality of grilling. First of all, substantial part of polluted air is not allowed into ambient air. Therefore heat transfer to the room air is also substantially prevented due to recirculation. Secondly, the present invention working results in a better hot air distribution within the grilling chamber with considerable advantages in the preparation of the food and in particular of food items positioned simultaneously on different shelves within this grilling chamber. In addition the hot air or flames or sparks emitted by the wood, coal, crushed paper, leaves or other material in the combustion zone does not directly strike the food within the grilling chamber, so preventing different degrees of preparation of different parts of one and the same food item. Moreover, the present invention is compact, lightweight, versatile and does not require gas or any Electric power, but can operate independently.

FIGS. 2 and 3 represent a modified embodiment of the grill platform (3) of FIG. 1. In FIGS. 2 and 3, parts corresponding to those of the already described figures are indicated by the same reference numerals.

As shown in FIG. 2, in another preferred embodiment of the present invention, the fan blades (10) could be placed underneath the Grill Platform (3). Similarly the distance from the fan blades (10) to the grill platform (3) could be adjusted to increase or decrease the speed of rotation of the rotator fan (4). Again the design of the fan blades (10) could be modified to enhance the efficiency, FIG. 3 depicts how the fan blades (10) can be integrated into the grill platform (3) to provide a more compact arrangement, suitable for travel. Further the supporting spine (1) may be arranged such that it does not go through the grill platform (3).

The present invention can be made as an add-on to an existing setup of any grill, or can be built it to replace the existing design of the outdoor grill where the Grill Platform (3) at the top, and the fan blades (10) closer to the heat source. Other embodiments are possible in the light of the present description while remaining within the scope of the present document.

In this application, the terminology 'embodiment' can be used to describe any aspect, feature, process or step, any combination thereof, and/or any portion thereof, etc. While the invention has been described in connection with specific embodiments thereof, it will be understood that it is capable of further modifications and this application is intended to cover any variations, uses or adaptations of the invention following, in general, the principles of the invention and including such departures from the present disclosure come within known or customary practice within the art to which the invention pertains and may be applied to the essential features herein before set forth.

Further it will be apparent to those skilled in the art that the objects of this invention have been achieved by providing the above invention. However various changes may be made in the structure of the invention without departing from the concept of the invention. Therefore, the scope of the invention is to be determined by the terminology of the above description and the legal equivalents thereof.

Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

I claim:

1. A rotating grill platform (3) capable of self rotation without any manual or electric stimulation, functional as an independent grill unit or placeable on a grill having a grill housing bottom (1) and a grill housing top (2), forming a casing defining a grilling chamber with the grill platform (3) supported centrally therein,
    comprising of a supporting spine assembly (8), a spine pivot assembly (13) and an apparatus base assembly (9),
    wherein the spine assembly (8) containing the grill platform (3) is placed on the apparatus base assembly (9) and further connected to a blade assembly (4) at the centre of a top bar of a blade support assembly (14) through a ball bearing wheel (27) and a screw (28),
    the grill platform (3) is connected to the spine assembly (8) using mechanical means such as a nut (21) and a washer (22),
    the grill platform (3) is further supported by a supporting flat plate (20) screwed to the spine assembly (8),
    and the grill platform (3) rotates on the spine pivot assembly (13), the spine pivot assembly (13) being mechanically connected to the blade assembly (4) through the ball bearing wheel (27),
    and the blade assembly (4) is naturally rotated by hot air/gas generated from cooking.

2. A rotating grill platform as claimed in claim 1 wherein the end of the spine of the spine assembly (8) comes to rest on and is supported on a device base supporting L shaped bar (19) suitable for resting on a horizontal surface, with a device vertical column (29) connecting to the blade support assembly (14).

3. A rotating grill platform as claimed in claim 1 wherein the entire grill platform (3) rotates on the pine pivot assembly (13) that is attached to the device base supporting L shaped bar (19).

4. A rotating grill platform as claimed in claim 1 wherein a plurality of horizontally extending and equidistantly spaced rods are provided in the grill platform (3) and extend from one end to the other of the grill platform (3) to form a circular peripheral ring pattern with empty slots defining elongated narrow openings between any of the two rods in the grill platform (3).

5. A rotating grill platform as claimed in claim 1 wherein the spine pivot assembly (13), connected to the blade assembly (4) through the ball bearing wheel (27) reduces friction during the rotation of the spine assembly (8) due to the motion of the fan blades (10).

6. A rotating grill platform as claimed in claim 1 wherein in opened configuration, the grilling apparatus is structured in the form of a semi-closed grilling chamber formed of rolled aluminum and defined by lateral walls, an upper wall, a lower wall and a rear wall, it being open frontally, the lateral walls being suitably hinged to device base supporting L shaped bar (19) supporting said grill platform (3) to successively close upon the same in closed configuration.

7. A rotating grill platform as claimed in claim 1 wherein the blade mechanism rotation handle (25) (38) is lifted and its position can be locked at a certain height on the blade rotation mechanism levels stopper (15), this in turn lifting the blade rotation mechanism attachment rings (16) which are connected by a chain link to the fan's blade adjustment holding ring (35) (36), the upward or downward motion of the blade mechanism rotation handle (25) or (38) making the fan blades (10) turn from 0 to 90 degrees on the blade holding base (17).

8. A rotating grill platform as claimed in claim 1 wherein when the fan blade (10) turns 90 degree and the blade mechanism rotation handle (25) or (38) is at the highest point, the fan blade (10) stops rotating because the hot air that directly hits against the face of the fan blades (10) is at a minimum.

9. A rotating grill platform as claimed in claim 1 wherein when the fan blade (10) turns 0 degree and the blade mechanism rotation handle (25) or (38) is at the lowest point, more hot air directly hits against the face of the fan blades (10) and the fan blades (10) rotate the fastest.

10. A rotating grill platform as claimed in claim 1 wherein the fan blades (10) are taperingly shaped and equidistantly situated from each other such that said blade assembly (4) is naturally rotated when the hot air/gas from the cooking hits these blades through the blade mechanism rotation handle (25).

11. A rotating grill platform as claimed in claim 1 and working thereof wherein the grilling chamber contains a combustion zone, located below the apparatus base, in which combustion is achieved by placing small pieces of wood, coal, crushed paper, leaves, or the like and igniting the same.

12. A rotating grill platform as claimed in claim 1 and working thereof wherein as hot gas/air streams upwards above the rotating grill platform (3), the fan blades (10) rotate due to this upward movement of hot gas/air, enables the air moved tangentially by the rotator fan to penetrate into said grilling chamber in all places and circulates the hot gas/air in the grilling chamber.

13. A rotating grill platform as claimed in claim 1 and working thereof wherein each air stream on striking the fan blades (10) is made to return towards the central axis of the grilling chamber and then propelled in an outward motion, uniformly filling the entire grilling chamber, the food placed on the rotating grill platform (3) being evenly cooked by the uniform heat generated and circulated.

14. A rotating grill platform as claimed in claim 1 and working thereof wherein the blade adjustment attachments ensure self rotation without any manual or electric stimulation and the speed of rotation is adjustable such that the rising hot air during the cooking process is uniformly circulated over the cooking area.

15. A rotating grill platform as claimed in claim 1 and working thereof wherein the blades rotation mechanism levels stopper (15) enables adjustment of the rotation speed of the fan blades (10).

16. A rotating grill platform as claimed in claim 1 wherein the fan blades (10) may be placed underneath the grill platform (3) or integrated into the grill platform (3).

17. A rotating grill platform as claimed in claim 1 wherein the distance from the blades (10) to the grill platform (3) may be adjusted to increase or decrease the speed of rotation of the fan blades (10).

18. A rotating grill platform as claimed in claim 1 wherein the spine assembly (8) may be arranged such that it does not go through the grill platform (3).

* * * * *